(12) United States Patent
Huang

(10) Patent No.: US 6,374,485 B1
(45) Date of Patent: Apr. 23, 2002

(54) AUTOMATIC PULL PIN FASTENING APPARATUS

(76) Inventor: Chuan-Chai Huang, No. 147, Sec. 1, Jing Gwo Rd., Hsinchu (TW)

( * ) Notice: Subject to any disclaimer, the term of this patent is extended or adjusted under 35 U.S.C. 154(b) by 129 days.

(21) Appl. No.: 09/592,094

(22) Filed: Jun. 12, 2000

(51) Int. Cl.[7] .......................... B23P 21/00; B23P 19/04; B23Q 7/10; B65H 3/60
(52) U.S. Cl. .................. 29/771; 29/243.521; 29/812.5; 221/200
(58) Field of Search .......................... 29/771, 243.521, 29/243.523, 243.525, 243.53, 244, 798, 818, 812.5; 221/200, 22, 92, 95, 111, 113, 211, 252

(56) References Cited

U.S. PATENT DOCUMENTS

| | | | | |
|---|---|---|---|---|
| 4,208,153 A | * | 6/1980 | Trethewy | 406/72 |
| 5,014,868 A | * | 5/1991 | Young et al. | 221/233 |
| 5,236,341 A | * | 8/1993 | Stafford | 221/200 |
| 5,465,868 A | * | 11/1995 | Bonomi | 221/165 |
| 6,264,063 B1 | * | 7/2001 | Turner et al. | 221/278 |

* cited by examiner

Primary Examiner—S. Thomas Hughes
Assistant Examiner—John C. Hong
(74) Attorney, Agent, or Firm—Pro-Techtor International Services

(57) ABSTRACT

An automatic pull pin fastening apparatus, it is comprised at least a feeding unit, a delivering device, a positioning board, a transporting device and a stretching device mounted on a machine. Wherein, the delivering device is installed between the feeding unit and the positioning board. The transporting device is mounted between the positioning board and the stretching device, and can be displaced to and fro therebetween. The delivering device sends fast by pushing a predetermined amount of pull pins to the positioning board at one time by using compressed air for taking and placing the pins by the transporting device and transporting to the stretching device, thus the stretching device pulls the predetermined amount of pull pins to combine a plurality of plates at one time to complete operation of pull pin fastening by automation processing. In this way, efficiency of production can be increased, while cost of production can be lowered.

10 Claims, 24 Drawing Sheets

AUTOMATIC PULL PIN FASTENING APPARATUS

BACKGROUND OF THE INVENTION

1. Field of the Invention

The present invention is related to an automatic pull pin fastening apparatus, and especially to such an apparatus used for combining a plurality of plates of different specifications, the fastening apparatus has a functional capability of quick arranging and pulling a predetermined amount of pull pins at a time, pull pin fastening can be completed easily in a very short time, number of workers can be reduced to the minimal, and cost of production can be lowered.

2. Description of the Prior Art

A pull pin 1 is comprised of a shank 12 with a head 13 slipped over by a sleeve 11 having a flange 111 (referring to FIG. 1). When the pull pin 1 is connected to a plurality of plates 91, 92, a hole is provided extending through both these plates 91, 92 lapped one over the other; the sleeve 11 of the pull pin 1 is placed in the hole to have the flange 111 of the sleeve 11 abutted on the plate 92, then the shank 12 of the pull pin 1 is forcedly pulled to make the head 13 extrude the sleeve 11 (referring to FIG. 2), the sleeve 11 thereby expands and deforms, the flange 111 is clamped on the plates 91, 92 to make this connection into effect. The shank 12 is broken on the end at the flange 111 of the sleeve 11 by resisting of the flange 111 and the external pulling force. Thereby, the shank 12 and the head 13 of the pull pin 1 can be removed from the sleeve 11 separately (referring to FIG. 3) to make the pull pin 1 connect with the plates in a neat and beautiful appearance.

However, the plates have to be drilled in advance before fastening the pull pin 1 to make connection of the pull pin 1 with the plates. That is, connection of the pull pin i with the plates certainly requires the processes of drilling, inserting, abutment, pulling and removing broken shanks etc., it is very hard, as is the case of conventional screw delivery mode with a track, to make connection of the pull pin 1 in an automation way. And more, if the plates to be combined are for different uses, connection areas of them will be very different, amount of connection areas for different plates is not same, in the industry therefore, pull pins have to be disposed, abutted, pulled and dealt with for waste material removing one by one, man power is necessary and thus cost of production is increased. Thereby, conventional pull pin fastening operation contains the big trouble of time and manpower wasting, and this is the motive of the present invention to finding a way to solve the trouble. The inventor of the present invention developed the automatic pull pin fastening apparatus based on his specific experience of years in design, study and development of automation equipment.

SUMMARY OF THE INVENTION

The main object of the present invention is to effect the automatic pull pin fastening operation in the mode of pushing pull pins by compressed air to increase the efficiency and decrease the cost of production.

To this object, practically, a feeding unit, a delivering device, a positioning board, a transporting device and a stretching device are mounted on a machine which is the automatic fastening apparatus. The machine is further provided with an air pressure unit and an oil pressure unit to supply the required dynamic force.

Wherein, the delivering device includes a tidying unit and a plurality of pin picking units and a distributing unit. The tidying unit arranges a plurality of pull pins in a line and delivers them to the pin picking units which each can choose a single pull pin to be collected and stored, and the delivering device presses air to supply it for a plurality of delivering pipes to send by pushing a predetermined amount of pull pins to the positioning board for using of the transporting device at one time, this can have the function of supplying each time with predetermined amount of pull pins to shorten the operation time for delivering pull pins.

Assuming that the positioning board is a plane board, it is provided with a plurality of pin picking holes, positions of the pin picking holes are in corresponding to connecting holes provided on the plates to be combined, in order to dispose the pull pins in the predetermined amount on the positioning board in advance to render the transporting device to transport the pull pins at one time. This can reduce the operation time for pull pin delivery.

The transporting device includes a transporting seat and a top board having therebetween a control board and a base board having a plurality of clamping claws, a pneumatic elevator cylinder is provided between the top board and the base board, a pneumatic cylinder for the claws is provided between the control board and the base board to allow the pneumatic elevator cylinder to move the claws. The pneumatic cylinder for the claws can also control opening and closing of the claws, thereby the transporting device can take, transport and place the pull pins in the predetermined amount at one time. This can increase the automatic fastening operation.

The stretching device is mounted on the machine, and is comprised of a pin receiving board and a bottom board, a middle board having thereon a plurality of elastic clamping sets is provided therebetween. The bottom board and the middle board are connected to an oil pressure stretching cylinder; by pressing opening and releasing closing functions of the clamping sets, the oil pressure stretching cylinder can simultaneously pull the pull pins of predetermined amount when it moves the middle board downwards, thereby, a function of combining a plurality of plates at one time can thus be provided, this can shorten processing time of combining the plates.

By the nature of connecting a plurality of plates at one time with the positioning board, the transporting device and the stretching device, together with the function of pushing the pull pins of predetermined amount by air pressure from the delivering device, the fastening apparatus can randomly change the positions for fastening of the pull pins of predetermined amount at any time in pursuance of the requirement of the plates to be combined. This provides excellent mobility of production, and can get rid of heavy burden of requirement of changing equipment for different plates to be combined and thereby can effectively lower the cost of processing.

The present invention will be apparent after reading the detailed description of the preferred embodiment thereof in reference to the accompanying drawings.

DETAILED DESCRIPTION OF THE PREFERRED EMBODIMENT

Figure 4:
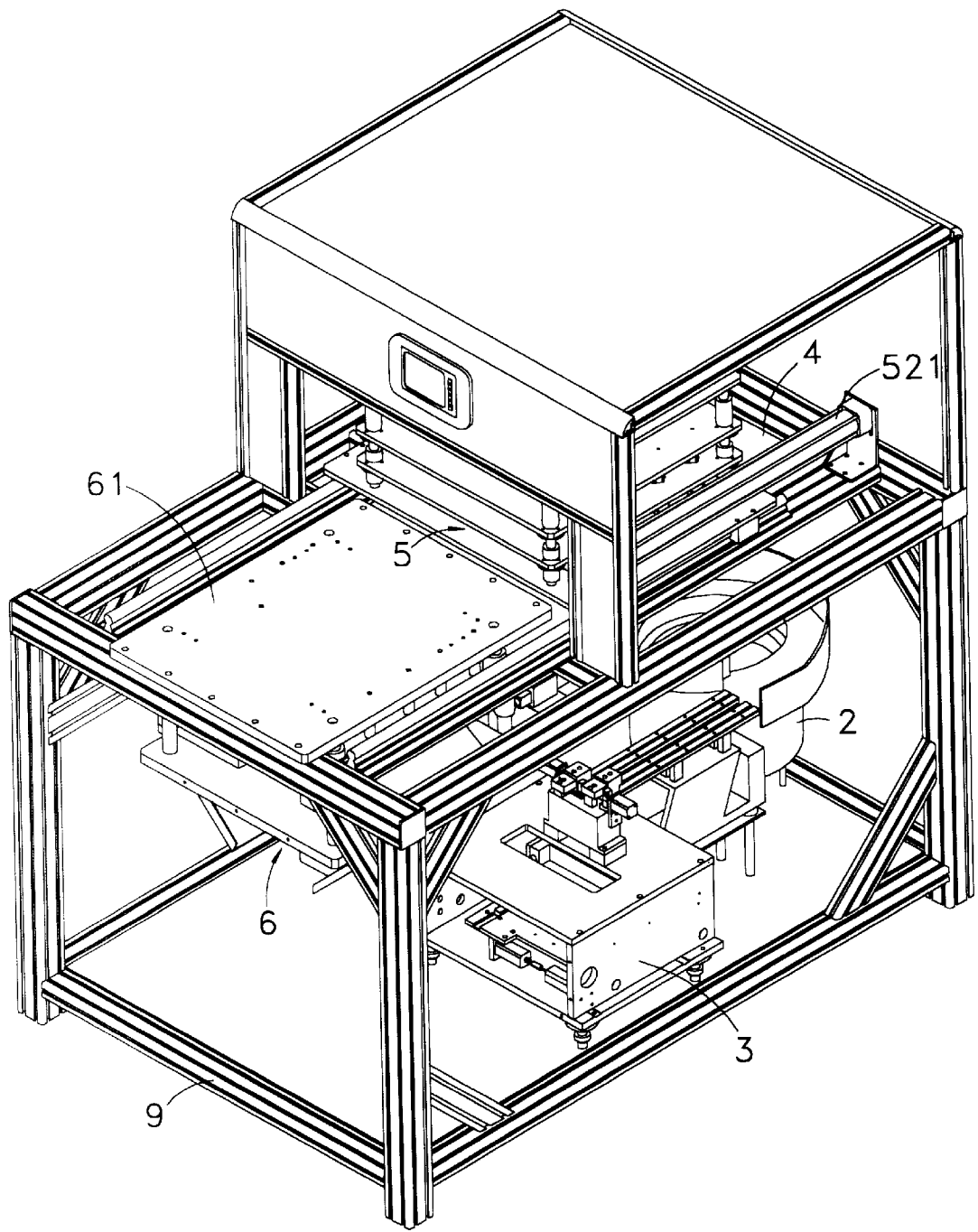
FIG. 4 is a perspective view of the present invention.
Figure 5:
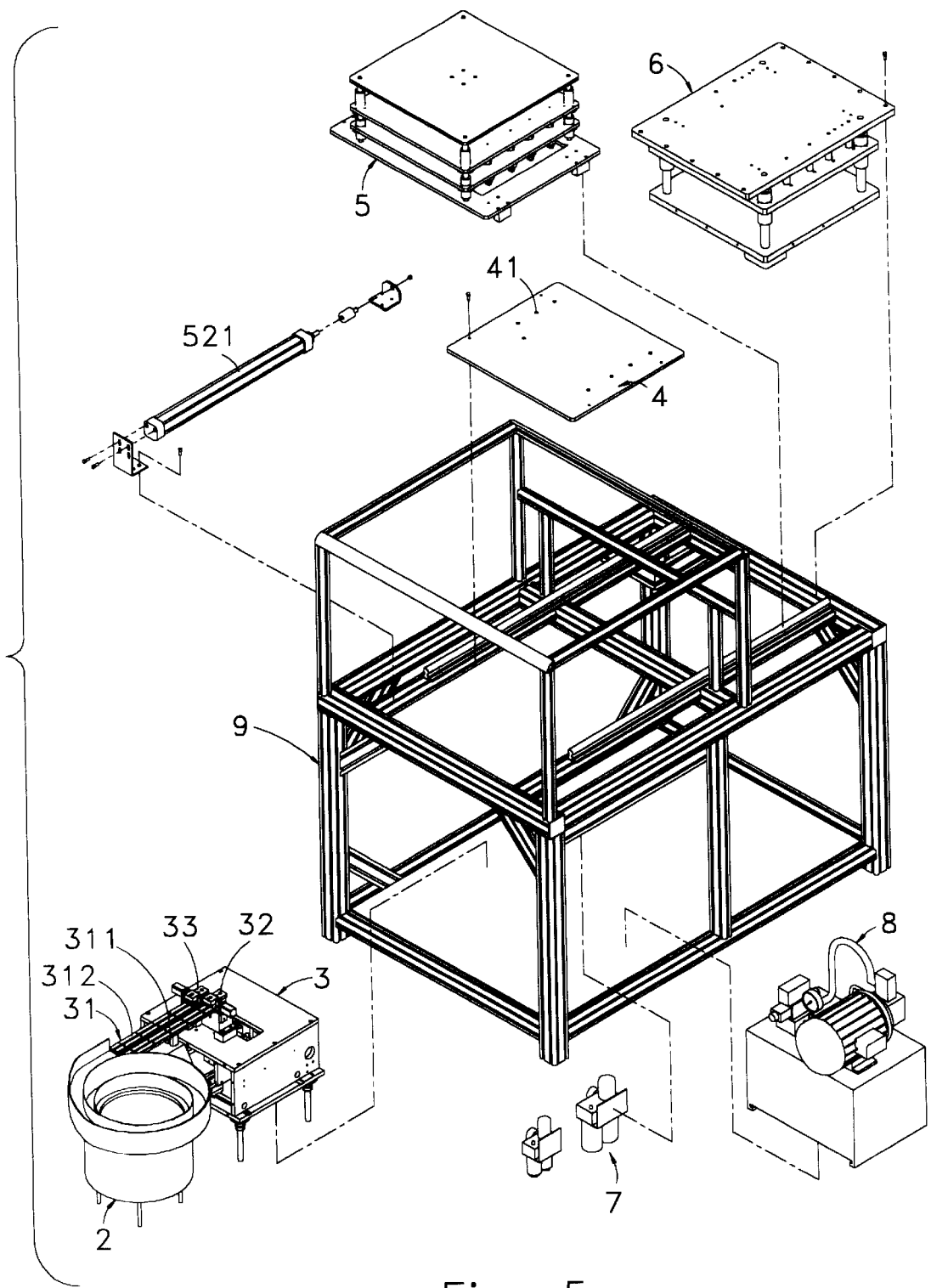
FIG. 5 is an analytic perspective view of the present invention.

Referring to FIGS. 4 and 5, an automatic pull pin fastening apparatus of the present invention is comprised at least a feeding unit 2, a delivering device 3, a positioning board 4, a transporting device 5 and a stretching device 6 mounted on a machine 9, the machine 9 is further provided with an air pressure unit 7 and an oil pressure unit 8 to supply the required dynamic force. Wherein:

the air pressure unit 7 is a conventional control device (referring to FIG. 4) capable of putting out compressed air with stable pressure to mount a plurality of pneumatic cylinders and distributing pull pins of predetermined amount; the oil pressure unit 8 is a conventional oil pressure output device capable of putting out liquid pressure oil with stable pressure to mount a plurality of oil pressure cylinders;

the feeding unit 2 is a conventional helical vibration feeding device, the feeding outlet of it and the delivering device 3 are connected with each other (referring to FIGS. 4 and 5), to have the scattered pull pins tidied by the feeding unit 2 and then supplied for the delivering device 3;

the delivering device 3 is installed between the feeding unit 2 and the positioning board 4 (referring to FIGS. 4 and 5), and includes a tidying unit 31, a plurality of pin picking units 32, 33 and a distributing unit 35. The pin picking units 32, 33 are mounted above a pin picking seat 34, the tidying unit 31 arranges a plurality of pull pins in a line and delivers them to the pin picking units 32, 33 which each can choose a single pull pin and cooperate with the distributing unit 35 to render the delivering device 3 to send a predetermined amount of pull pins to the positioning board 4 for using of the transporting device 5 at one time.

Wherein, the tidying unit 31 includes pin arranging rails 311 and 312 (referring to FIGS. 4 and 5) mounted on a vibrator (not shown), the pin arranging rails 311, 312 can receive a plurality of pull pins arranged in lines which are delivered to the pin picking units 32, 33 by the pushing action generated by the vibrator.

Figure 6:
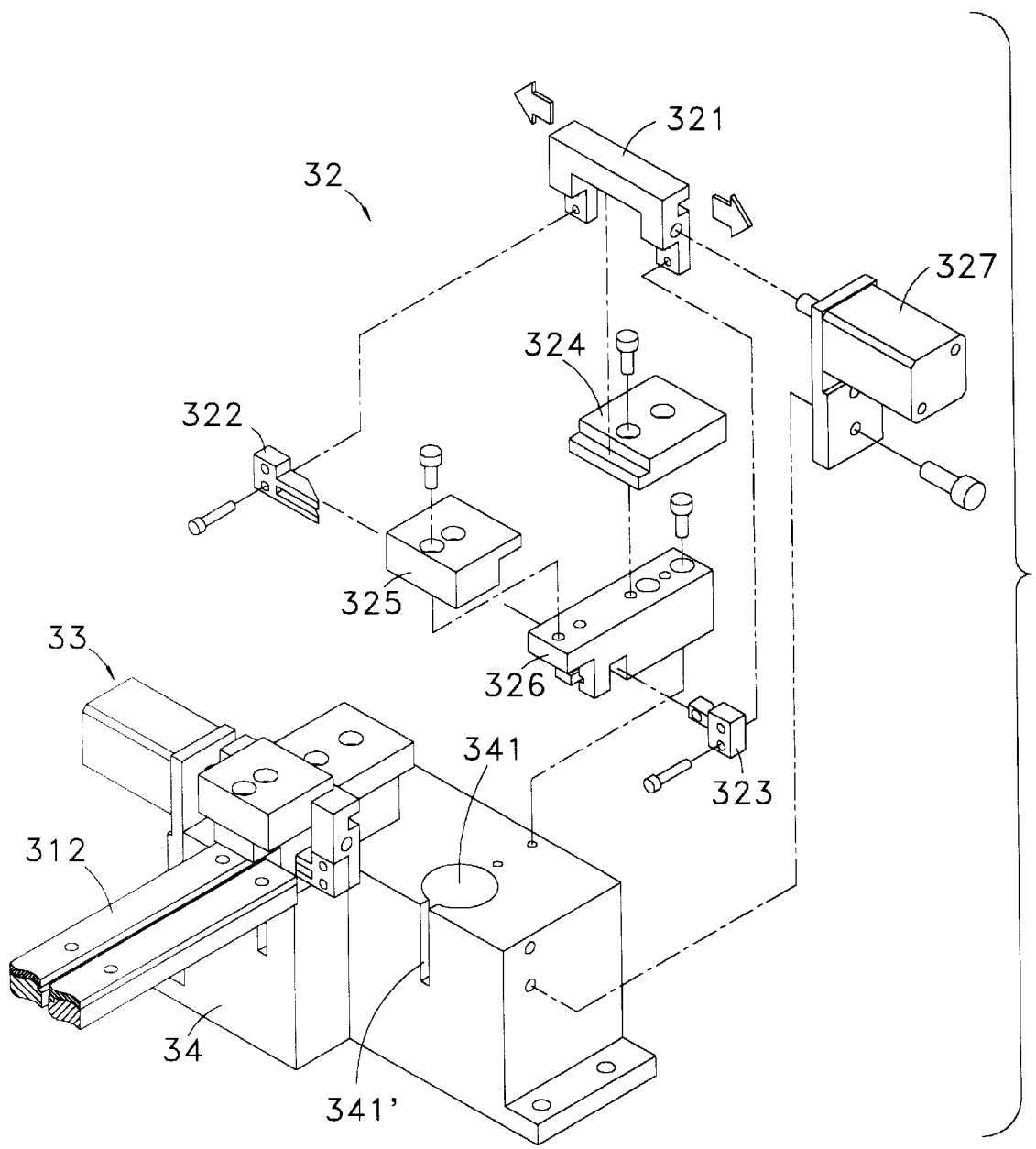
FIG. 6 is an analytic perspective view of the pin picking units.
Figure 7:
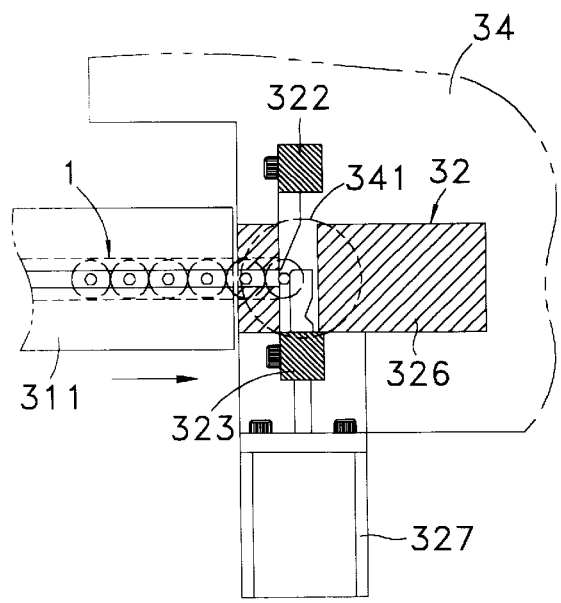
FIG. 7 is a sectional view showing a state of the pin picking units of the present invention.

The pin picking units 32, 33 are mutually symmetrically disposed (referring to FIG. 5) to reduce space occupied by the delivering device 3; the pin picking unit 32 includes a lower guide block 324 and an upper guide block 325 mounted on a support block 326 and having a slide block 321 mounted therebetween (referring to FIG. 6), the slide block 321 can freely slide between the lower guide block 324 and the upper guide block 325 with the two ends thereof being provided respectively with a pin pushing block 322 having a beveled surface and a pin stop block 323. One end of the slide block 321 is provided with a pin picking pneumatic cylinder 327 to bring the slide block 321 to move synchronically therewith. The support block 326 has a grooved rail for receiving the pull pins, and has a groove for receiving the pin pushing block 322 and the pin stop block 323.

The pin picking seat 34 is provided with a plurality of conical holes 341 (referring to FIG. 6) which each has on one end thereof a slot 341', so that the pull pins can be smoothly guided into the conical holes 341 with their heads 13 pointing upwards by providing the slots 341'. The pin picking seat 34 is adapted for assembling the pin picking units 32, 33 thereon, so that the groove on the support block 326 of the pin picking units 32, 33 can be aligned with the conical holes 341.

Figure 8:
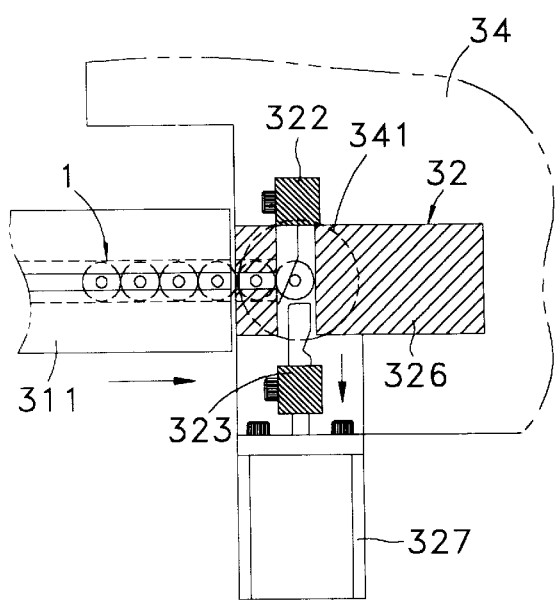
FIG. 8 is a sectional view showing another state of the pin picking units of the present invention.
Figure 9:
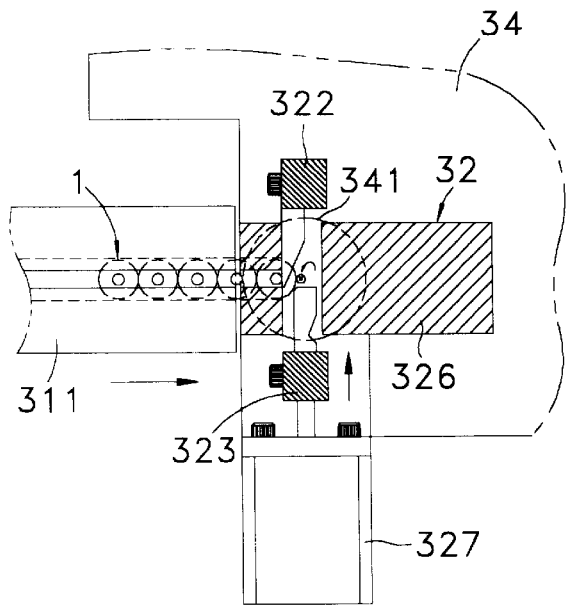
FIG. 9 is a sectional view showing another state of the pin picking units of the present invention.
Figure 10:
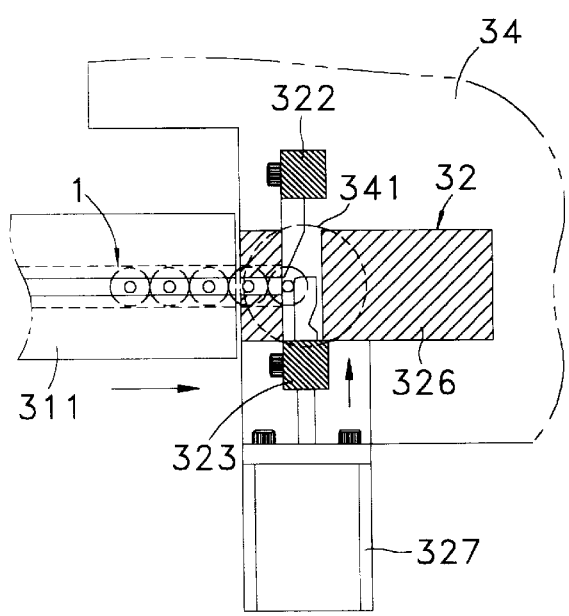
FIG. 10 is a sectional view showing a further state of the pin picking units of the present invention.

When the pull pins 1 are delivered to the pin picking units 32, 33 by means of the pin arranging rails 311, 312 (referring to FIG. 6), the sleeves 11 of the pull pins 1 in the support block 326 is stopped by the pin stop block 323 and stay there unmoved; at this time, the pin picking pneumatic cylinder 327 retracts to move the slide block 321 to synchronically move the pin pushing block 322 and the pin stop block 323 therewith, the beveled surface of the pin pushing block 322 pushes a single pull pin 1 to the groove of the support block 326 to make dropping of the pull pin 1 into the conical holes 341 of the pin picking seat 34 (referring to FIG. 8). The pin picking units 32, 33 have the function of choosing a single pull pin 1, now, the plural pull pins 1 in the pin arranging rails 311, 312 will take the place to get into the support block 326, and the pin picking pneumatic cylinder 327 moves forwardly the slide block 321 to make the pin pushing block 322 and the pin stop block 323 get back synchronically. The subsequent pull pins 1 are stopped by the pin pushing block 322 and the pin stop block 323 to stay put in the support block 326 (referring to FIGS. 9 and 10) ready for the next choosing action. So that the pin picking units 32, 33 can repeatedly choose a single pull pin 1 for use of the distributing unit 35.

Figure 11:
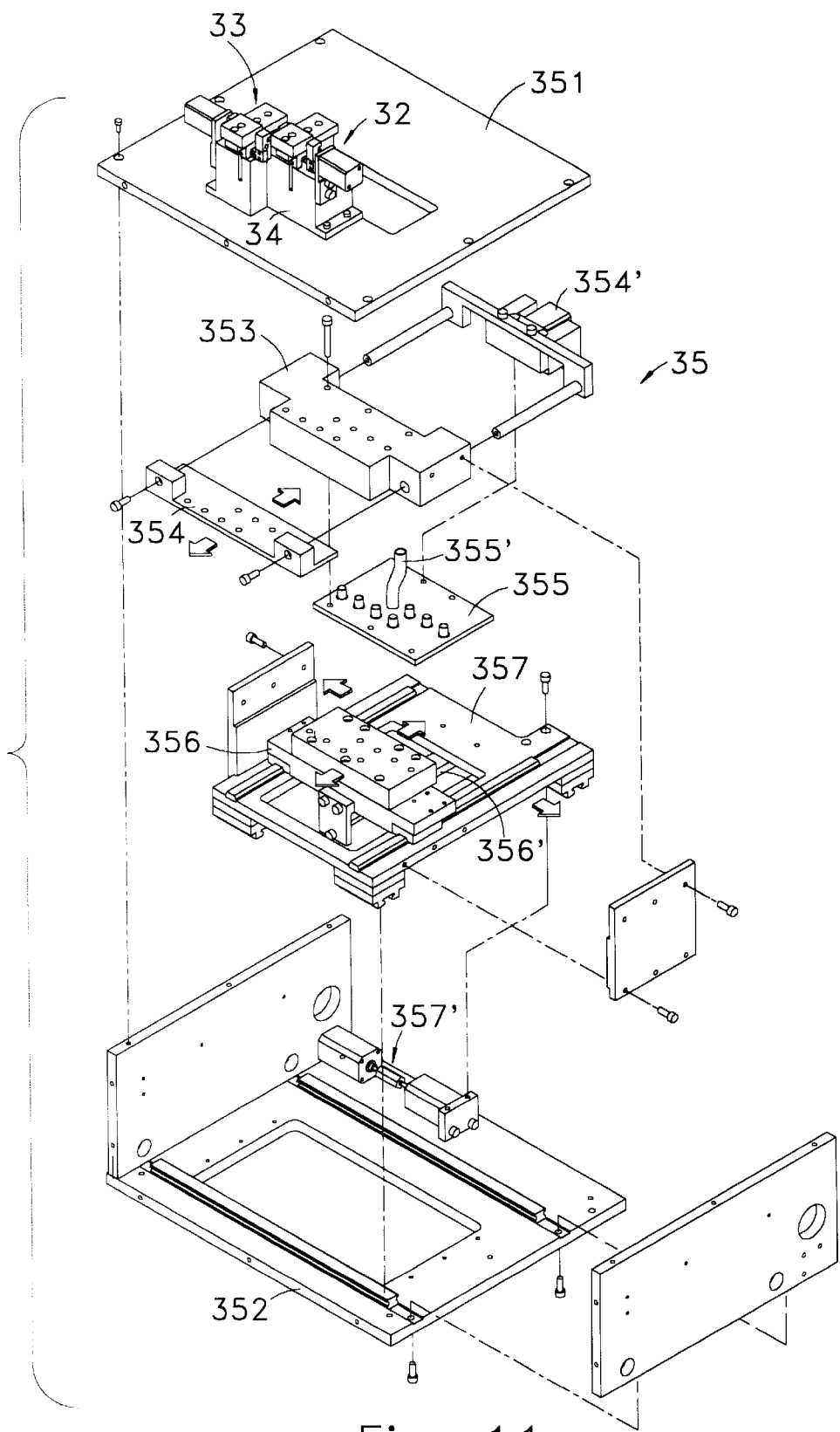
FIG. 11 is an analytic perspective view of a distributing unit of the present invention.

The distributing unit 35 includes an upper board 351 and a lower board 352 with a pin collecting block 353 therebetween, and includes a movable panel 354, a delivery board 355, a delivery sliding platform 356 and a pin distributing platform 357 (referring to FIG. 11). The pin collecting block 353 is connected with one end of the delivery board 355, while the other end of the delivery board 355 is connected to a movable panel pneumatic cylinder 354' of which a pusher rod is extended through the pin collecting block 353 to connected with the movable panel 354, the movable panel 354 closely leans on the pin collecting block 353 so that the movable panel pneumatic cylinder 354' can make synchronic movement of the movable panel 354 therewith. The delivery sliding platform 356 is provided between the pin collecting block 353 and the pin distributing platform 357 which has thereon a sliding-platform pneumatic cylinder 356' in connection with the delivery sliding platform 356; so that the delivery sliding platform 356 can displace by means of the slide rail and the sliding-platform pneumatic cylinder 356' of the pin distributing platform 357. The pin distributing platform 357 is mounted on the slide rail of the lower board 352, and is connected with a positioning pneumatic cylinder set 357' provided on the lower board 352, so that the pin distributing platform 357 is synchronically displaced sectionally by and moves together with the positioning pneumatic cylinder set 357'.

Figure 12:
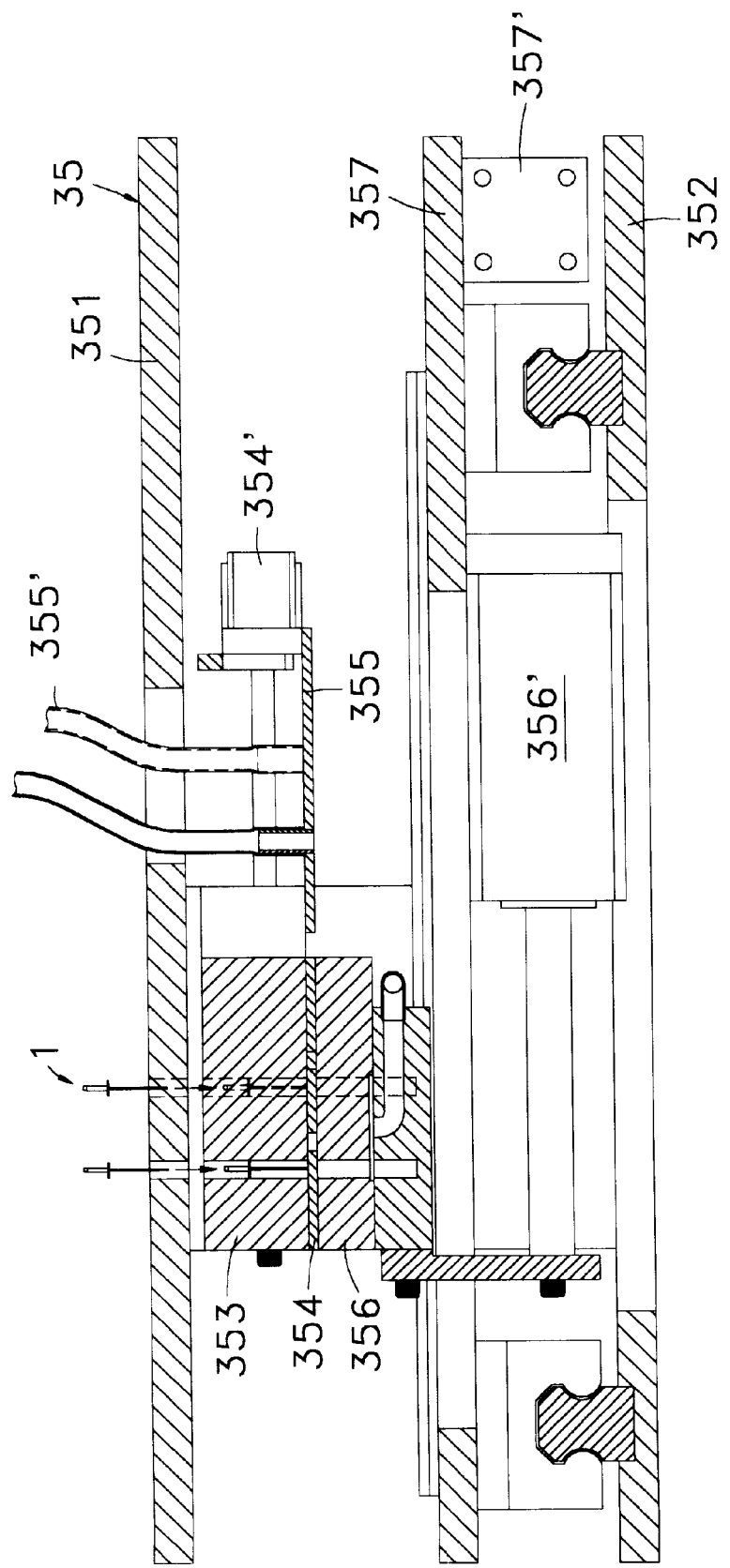
FIG. 12 is a sectional view showing a state of the distributing unit of the present invention.

And more, the upper board 351, the pin collecting block 353, the movable panel 354, the delivery board 355 and the delivery sliding platform 356 are all provided with a plurality of through holes or holes for receiving pull pins. Position arrangements of these through holes or holes for the members are same, and the through holes of the delivery board 355 are provided thereon with nozzles to connect a plurality of delivery pipes 355'. The delivery sliding platform 356 is provided therein with a plurality of air ways (referring to FIG. 12) which respectively communicate with a plurality of grooves and the air pressure unit 7 to render the through holes or holes to store therein or to deliver a predetermined amount of pull pins.

Figure 13:
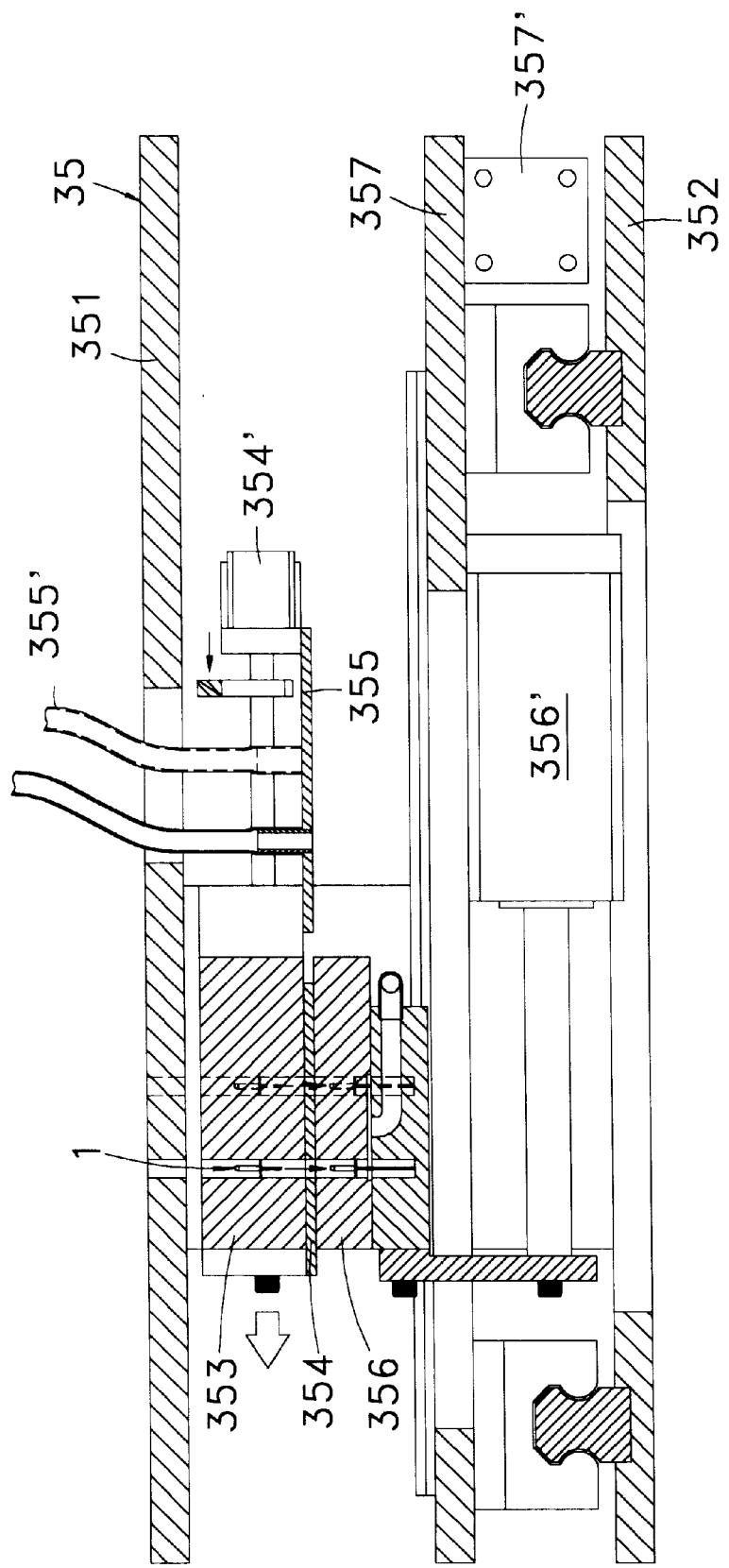
FIG. 13 is a sectional view showing another state of the distributing unit of the present invention.
Figure 14:
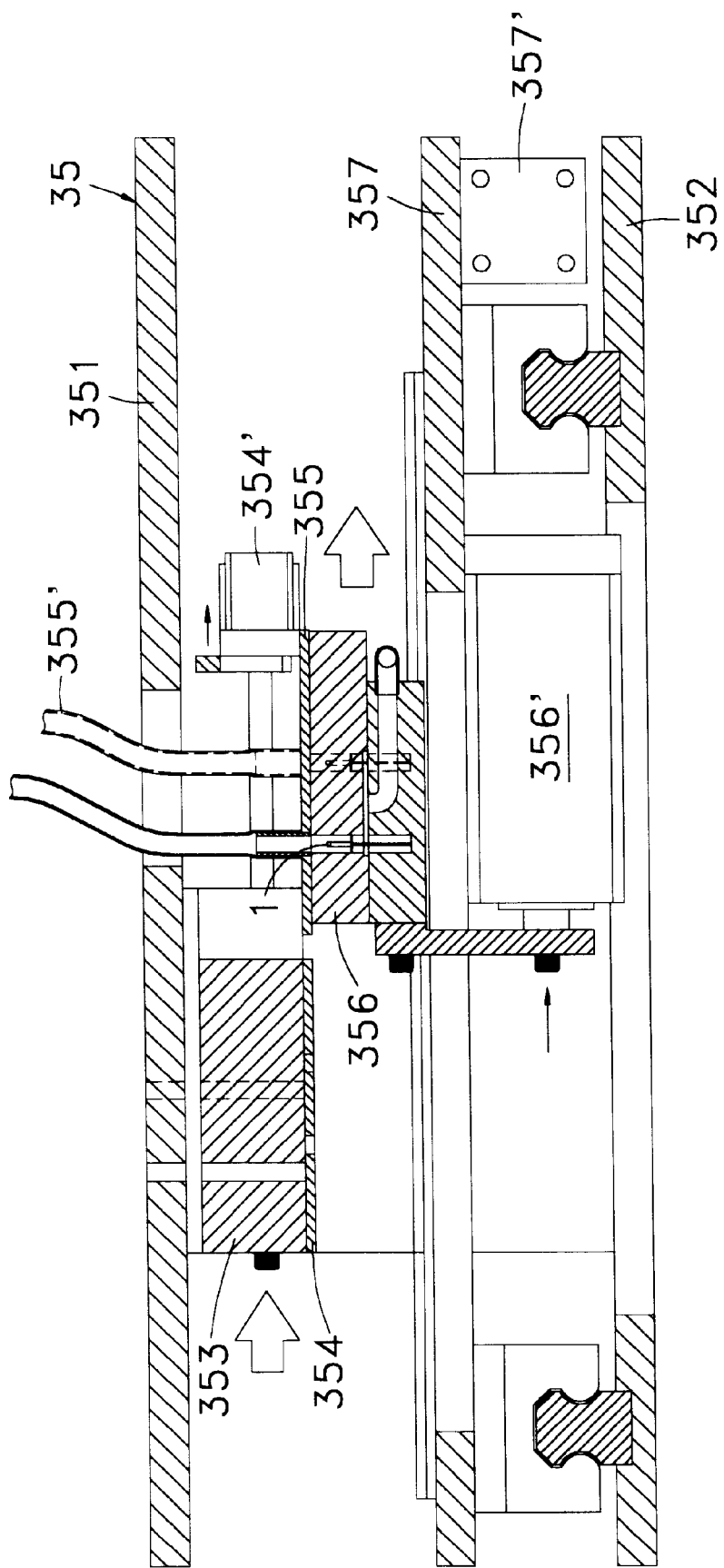
FIG. 14 is a sectional view showing another state of the distributing unit of the present invention.
Figure 15:
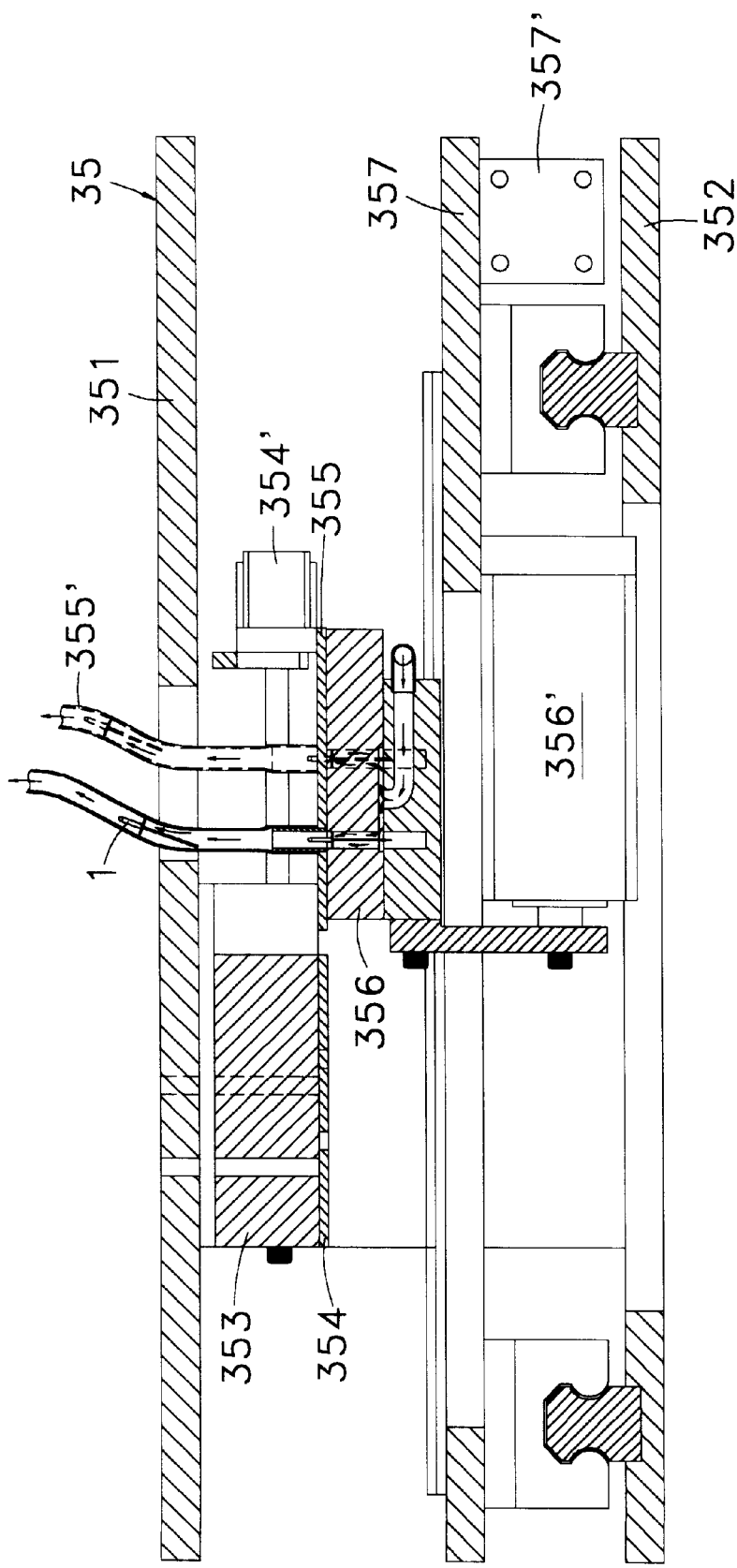
FIG. 15 is a sectional view showing a further state of the distributing unit of the present invention.

When the pin picking units 32, 33 choose the plural pull pins 1 to send to the distributing unit 35 (referring to FIG. 12), the pull pins 1 will drop into the pin collecting block 353 through the upper board 351, and the plural pull pins 1 are stopped by the movable panel 354 and are stored temporarily in the pin collecting block 353. At this time, the positioning pneumatic cylinder set 357' retracts to displace sectionally the pin distributing platform 357, so that the pull pins 1 can be filled in the through holes in the pin collecting block 353 to render it to store a predetermined amount of pull pins. When the delivering device 3 is to deliver a predetermined amount of pull pins 1, the movable panel pneumatic cylinder 354' retracts and makes synchronic movement of the movable panel 354 therewith to drop the pull pins 1 onto the delivery sliding platform 356 (referring to FIG. 13). And the sliding-platform pneumatic cylinder 356' retracts to bring the delivery sliding platform 356 to a position under the delivery board 355 (referring to FIG. 14). Compressed air from the air pressure unit 7 now is led into the air ways of the delivery sliding platform 356 to allow the predetermined amount of pull pins 1 to be pushed by the compressed air to get off the delivery sliding platform 356. Thereby, the predetermined amount of pull pins 1 are delivered along the delivery pipes 355' to the positioning board 4 (referring to FIG. 15). In this way, the predetermined amount of pull pins 1 are fed at one time, and time for delivery of the predetermined amount of pull pins can be largely reduced.

Figure 16:
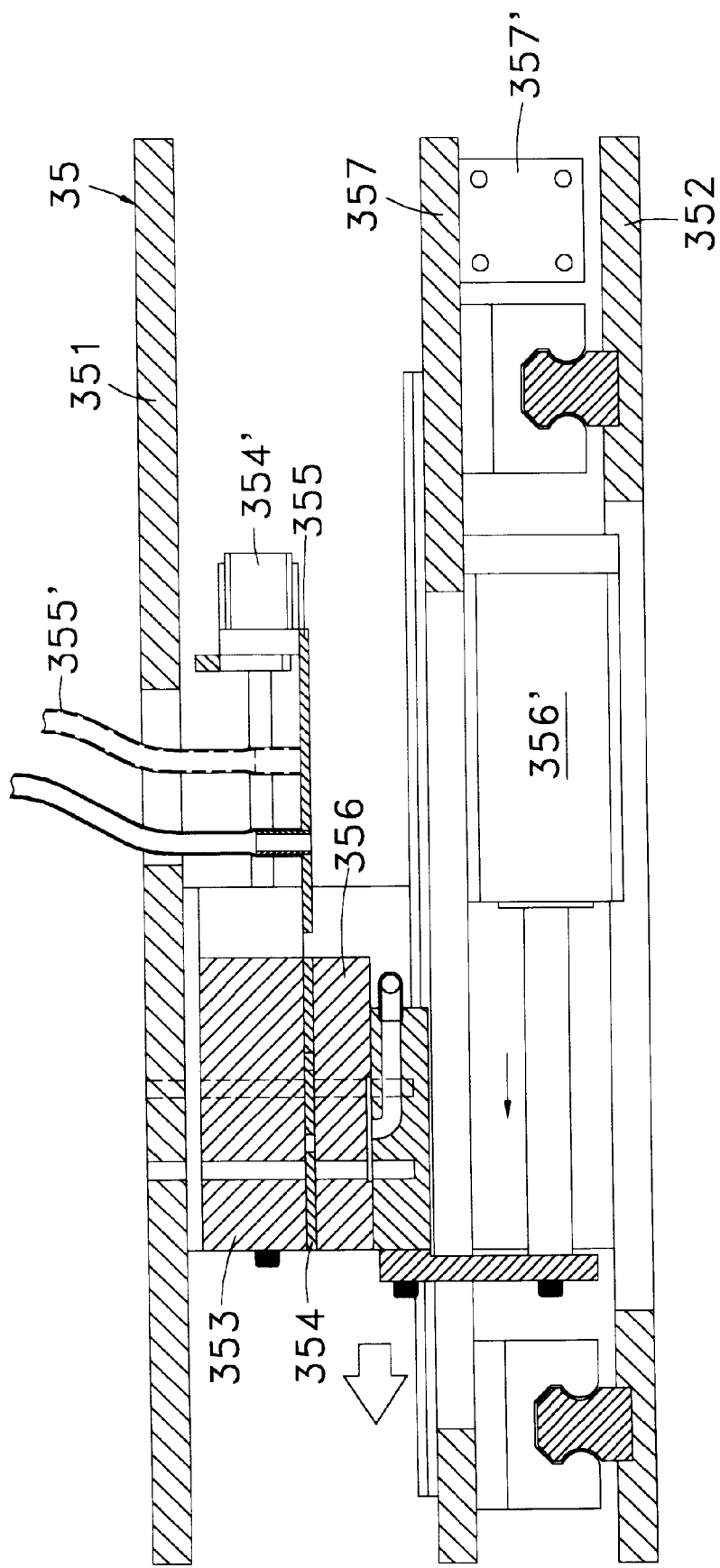
FIG. 16 is a sectional view showing an even further state of the distributing unit of the present invention.

Moreover, after the distributing unit 35 pushes to deliver the plural pull pins 1, the sliding-platform pneumatic cylinder 356' moves the delivery sliding platform 356 to get back to a position under the pin collecting block 353 (referring to FIG. 16) ready for the next pull pin pushing process. When the delivery sliding platform 356 delivers the plural pull pins 1 with compressed air, the pin collecting block 353 can still simultaneously stores and tidies other predetermined amount of pull pins 1, i.e., the pin collecting block 353 and the delivery sliding platform 356 are independently operated, this can elevate the efficiency of the automatic pull pin fastening apparatus.

The positioning board 4 is a plane plate (referring to FIG. 5), and is provided thereon with a plurality of pin picking holes 41 of which the positions are in correspondence with those of the openings of the plates 91, 92 to be combined. And the pin picking holes 41 can connect with the delivery pipes 355' to distribute the predetermined amount of pull pins 1 at their given positions for connecting, this provides a function of preliminary disposing of the pins, and renders the transporting device 5 to be able to transport the pull pins in the predetermined amount at one time. This can reduce the operation time for pull pin arrangement.

Figure 17:
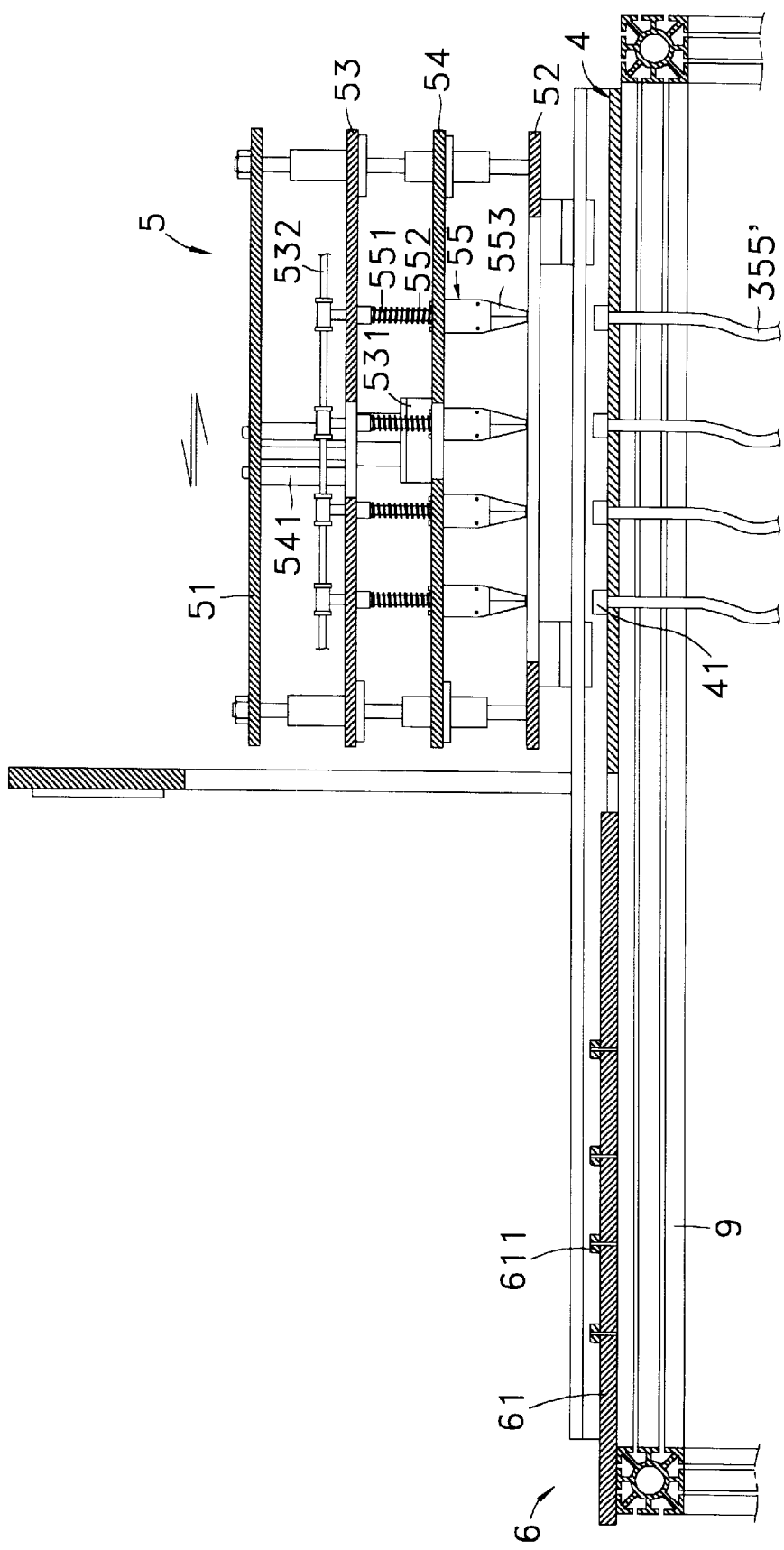
FIG. 17 is a sectional view showing the transporting device of the present invention.

The transporting device 5 is mounted between the positioning board 4 and the stretching device 6, and can be displaced to and fro therebetween (referring to FIGS. 4, 5 and 17). The transporting device 5 is comprised of a transporting seat 52 and a top board 51 with a control board 53 and a base board 54 therebetween. The transporting seat 52 is mounted on a slide rail of the machine 9 to be connected with a transporting pneumatic cylinder 521 and can freely slide, the control board 53 and the base board 54 can freely slide up and down between the transporting seat 52 and the top board 51, the control board 53 can be connected with a pneumatic cylinder 531 for the claws, while the base board 54 can be connected with a pneumatic elevator cylinder 541. The pneumatic cylinder 531 for the claws is mounted on the base board 54, while the pneumatic elevator cylinder 541 is mounted on the top board 51, thereby, the pneumatic elevator cylinder 541 can bring the control board 53 and the base board 54 to move synchronically therewith. Wherein, the control board 53 is provided with a negative pressure pipe 532, the base board 54 is provided with a plurality of claws 55; the claws 55 correspond by position to those of the openings on the plates to be combined.

Figure 1:
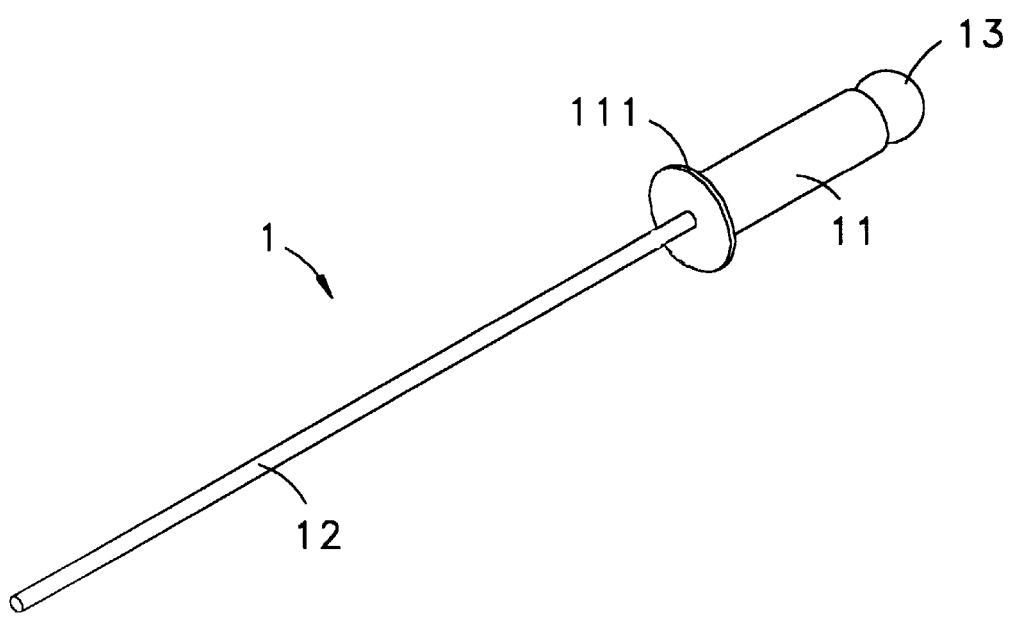
FIG. 1 is a perspective view showing a pull pin.
Figure 2:
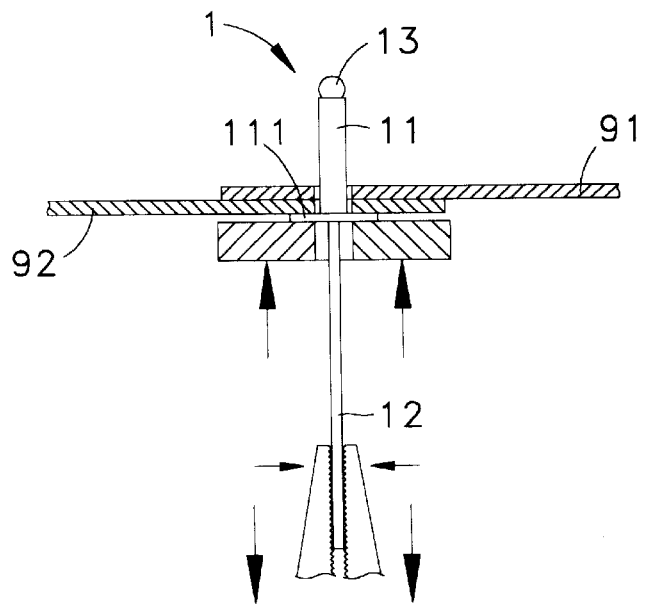
FIG. 2 is a schematic view showing the operation of fastening of the pull pin.
Figure 3:
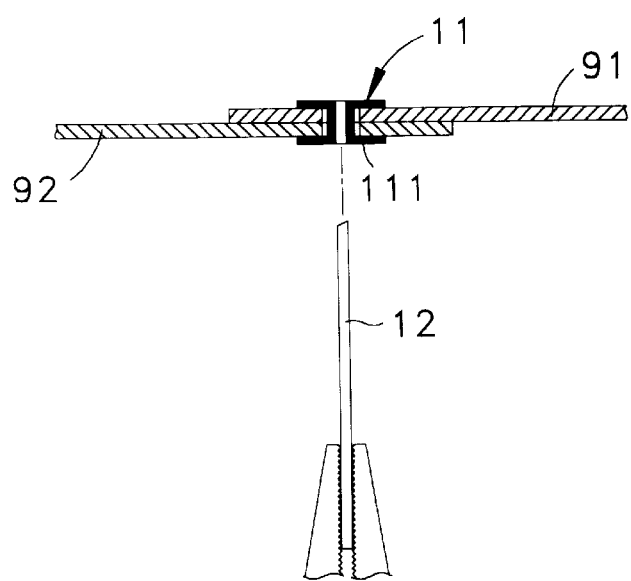
FIG. 3 is another schematic view showing the operation of fastening of the pull pin.

The claws 55 each includes a pipe like rod 551 slipped thereover a spring 552 to push one of a plurality of clamping blocks 553 (referring to FIGS. 4, 5 and 17). The pipe like rod 551 is a hollow pipe, the inner diameter of the pipe like rod 551 is between the values of the external diameters of the sleeve 11 and the flange 111 of a pull pin 1 (referring to FIG. 1). The pipe like rod 551 is connectible on the open end thereof to a negative pressure pipe 532, while the other end thereof can receive the sleeve 11 of a pull pin 1. The clamping blocks 553 are provided with respective grooves to render themselves tightly clamp each a pull pin. The claws 55 can be pressed to push the pipe like rods 551 to open the clamping blocks 553, and can release the pipe like rods 551 to close the clamping blocks 553 by the elasticity of the springs 552. Wherein, the pipe like rods 551 can tightly suck each pull pin 1 by the suction force generated by the negative pressure pipe 532 when the clamping blocks 553 open. In this way, each claw 55 can easily hold a pull pin 1, thus a function of pin suction is provided.

Figure 24:
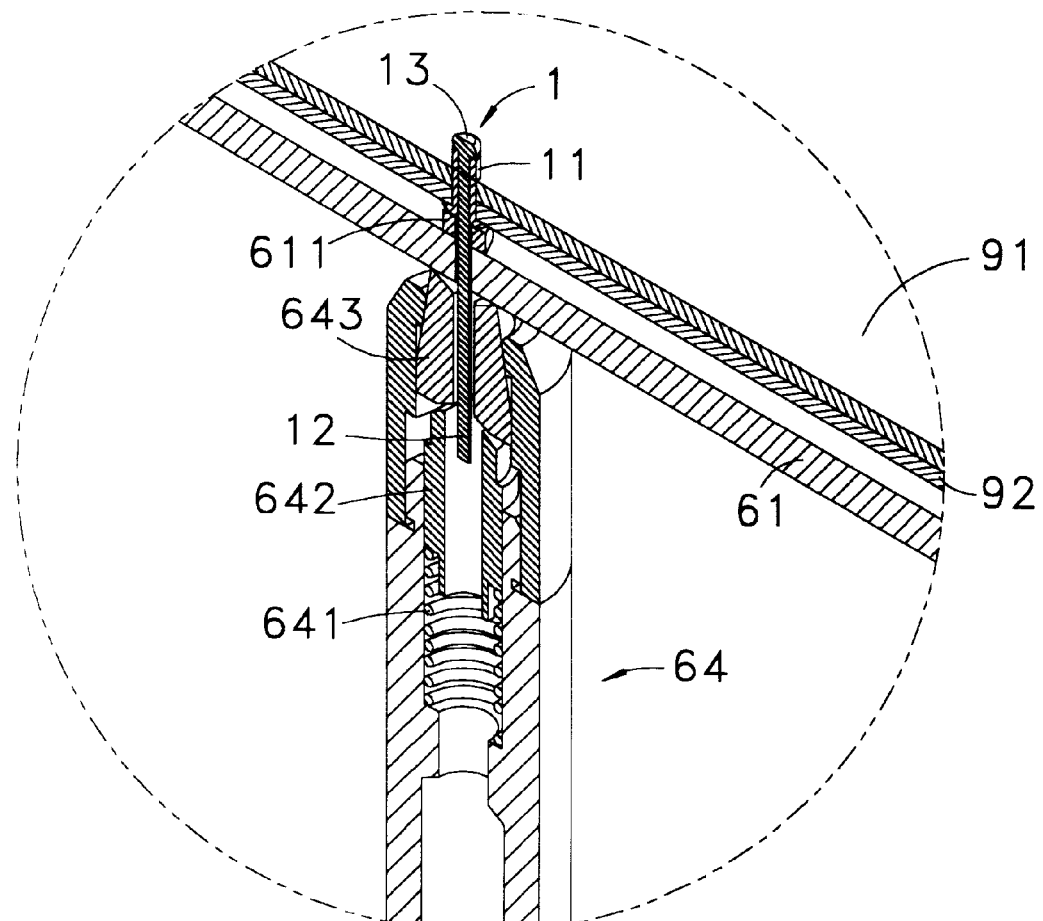
FIG. 24 is an exploded sectional view of a clamping set of the present invention.
Figure 25:
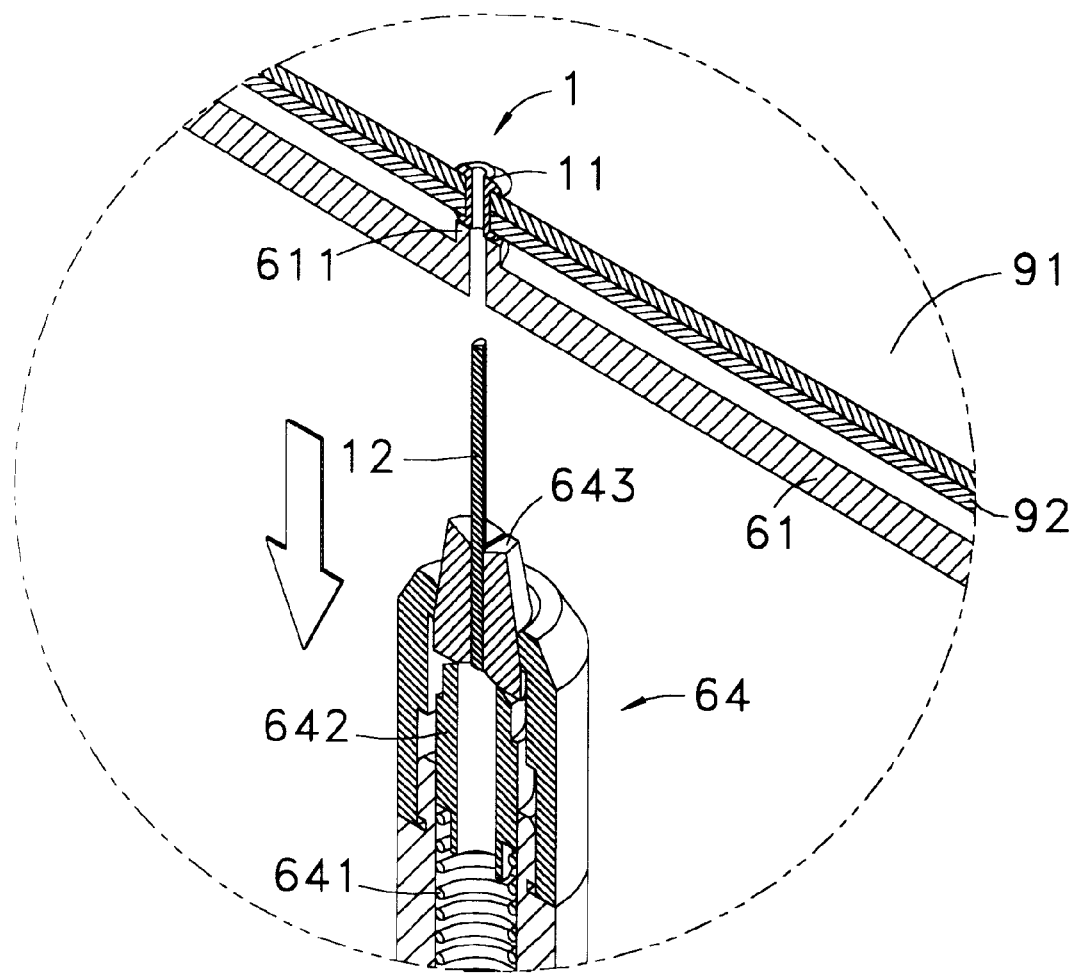
FIG. 25 is another exploded sectional view of the clamping set of the present invention.

A plurality of elastic clamping sets 64 of the stretching device 6 are provided and each includes a pipe body to mount therein a spring 641, a movable block 642 and clamping blocks 643 (referring to FIG. 24). The movable blocks 642 each is a hollow pipe, one end thereof can be mounted therein with a spring 641, while the other end thereof is a conical surface. The clamping blocks 643 can be closed to form a conical shape with a conical surface and a toothed slit for engaging a pull pin 1. When the clamping blocks 643 are pressed down (referring to FIG. 24), the conical surfaces of the clamping blocks 643 and the movable blocks 642 mutually press to loosen the clamping blocks 643 to reveal their slits which each is wider than the shank 12 of the pull pin 1, so that the shank 12 of the pull pin 1 can be received in a damping set 64. When the pressing force on the clamping blocks 643 is released (referring to FIG. 25), the movable blocks 642 are pushed by the springs 641 to tightly close the clamping blocks 643 to hold the shanks 12 of the pull pins 1. Thereby, the clamping sets 64 are provided with clamping function by the actions of opening by pressing and closing by releasing.

Figure 23:
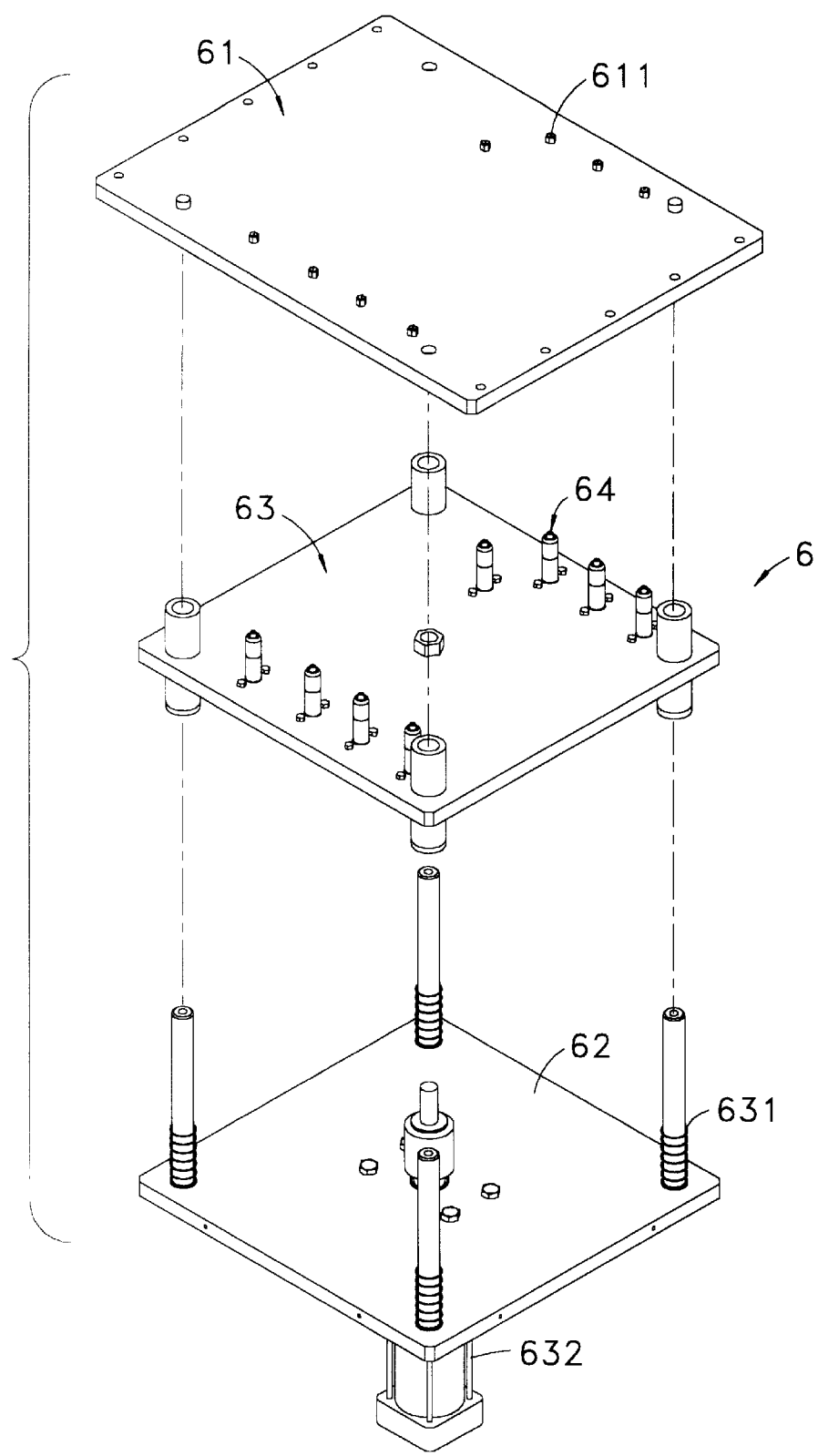
FIG. 23 is an analytic perspective view of the stretching device of the present invention.
Figure 26:
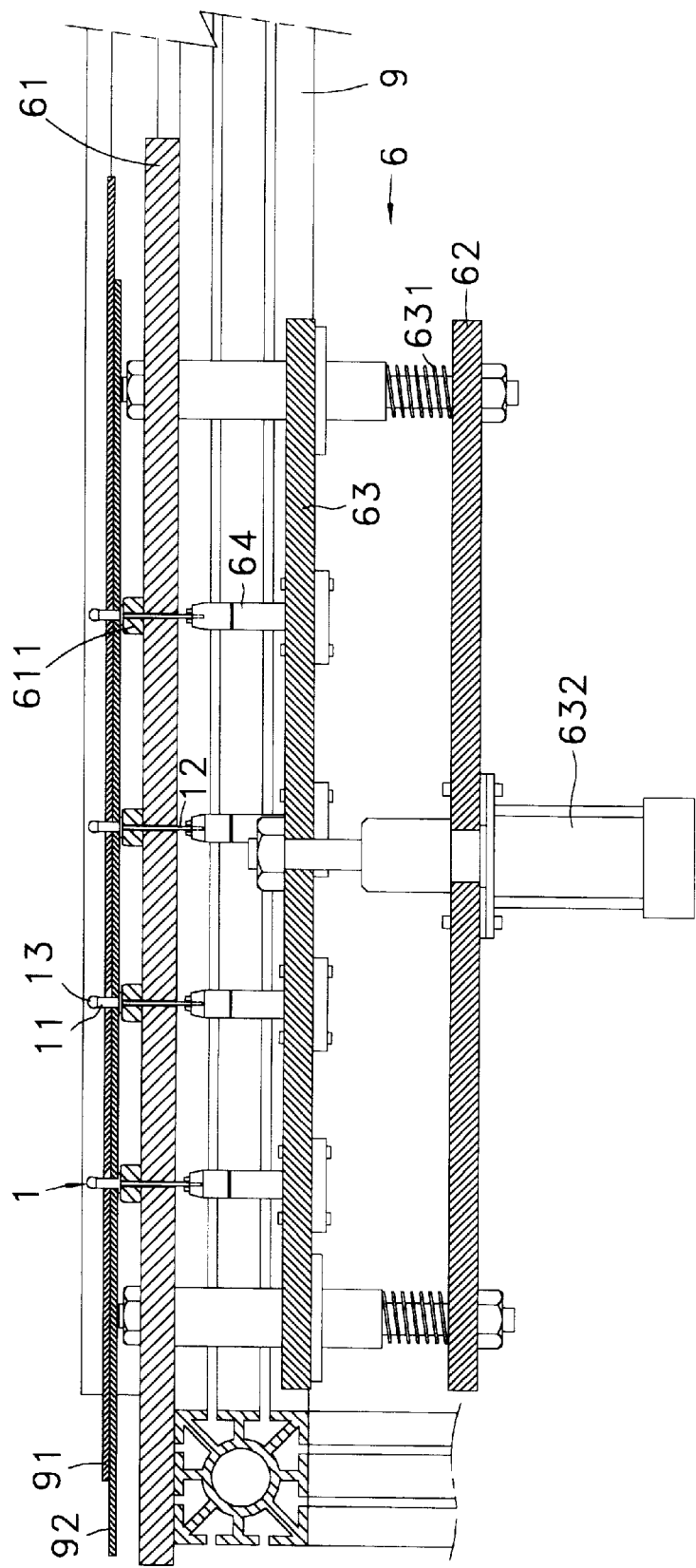
FIG. 26 is a sectional view showing the stretching device of the present invention.

The stretching device 6 is mounted on the machine 9 (referring to FIGS. 4 and 5), and includes a pin receiving board 61 and a bottom board 62, a plurality of springs 631 and a middle board 63 are located therebetween (referring to FIG. 23), the bottom board 62 and the middle board 63 are connected with an oil pressure stretching cylinder 632 to allow up and down free sliding of the middle board 63 between the pin receiving board 61 and the bottom board 62 (referring to FIG. 26). The middle board 63 is mounted thereon a plurality of clamping sets 64 of which the positions correspond to those openings on the plates 91, 92 to be combined. The pin receiving board 61 is provided thereon with a plurality of stop stubs 611, the center of each stop stub 611 has a through hole exactly fitting the shank 12 of a pull pin 1, the positions of the centers correspond to those openings on the plates 91, 92 to be combined. Wherein, when the oil pressure stretching cylinder 632 is not in operation, the ends of the clamping sets 64 of the middle board 63 are always subjected to spring pressure to closely lean on the bottom of the pin receiving board 61, so that the clamping sets 64 render the clamping blocks 643 to keep loose state.

Figure 18:
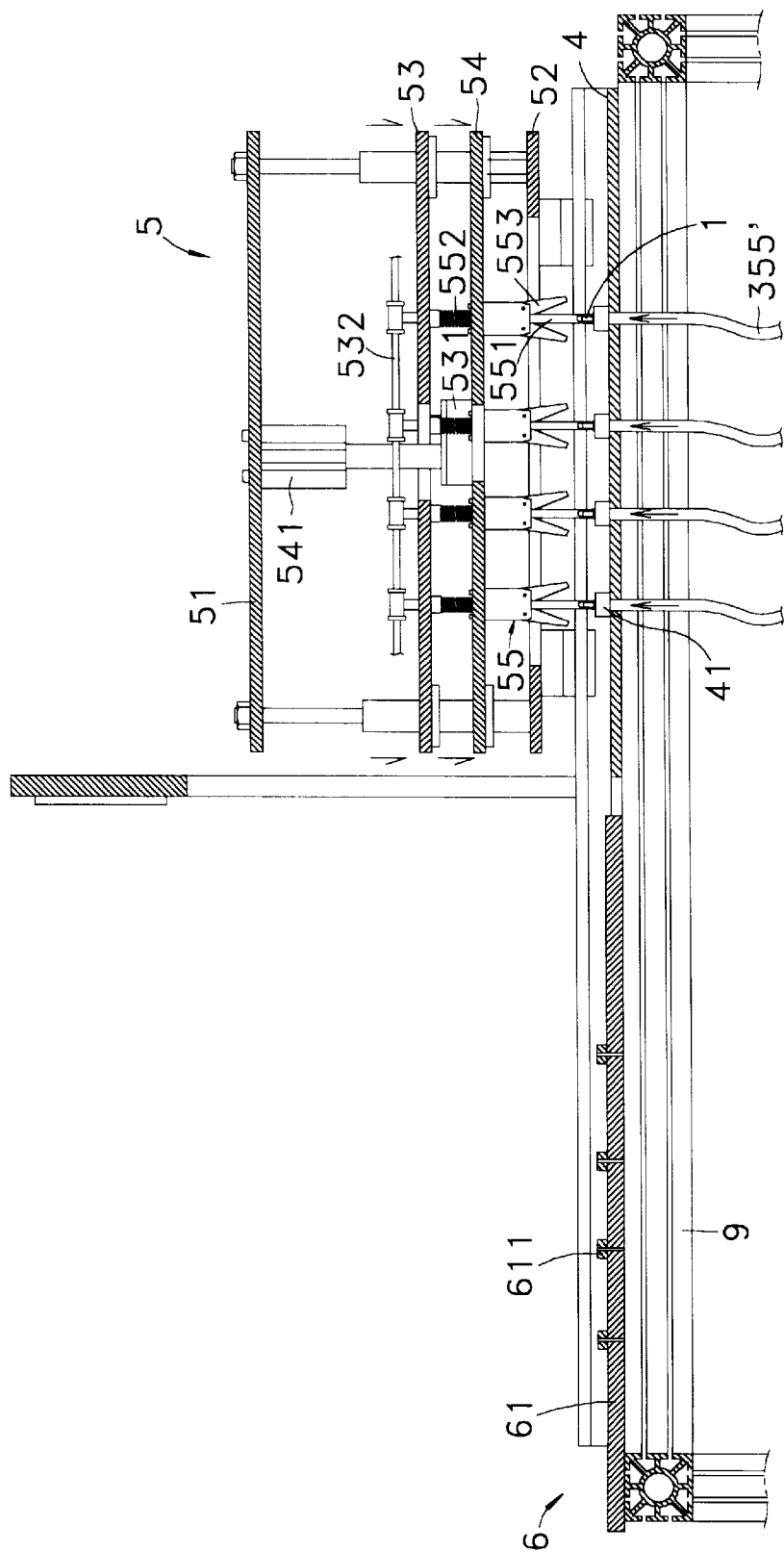
FIG. 18 is a sectional view showing a state of the transporting device of the present invention.
Figure 19:
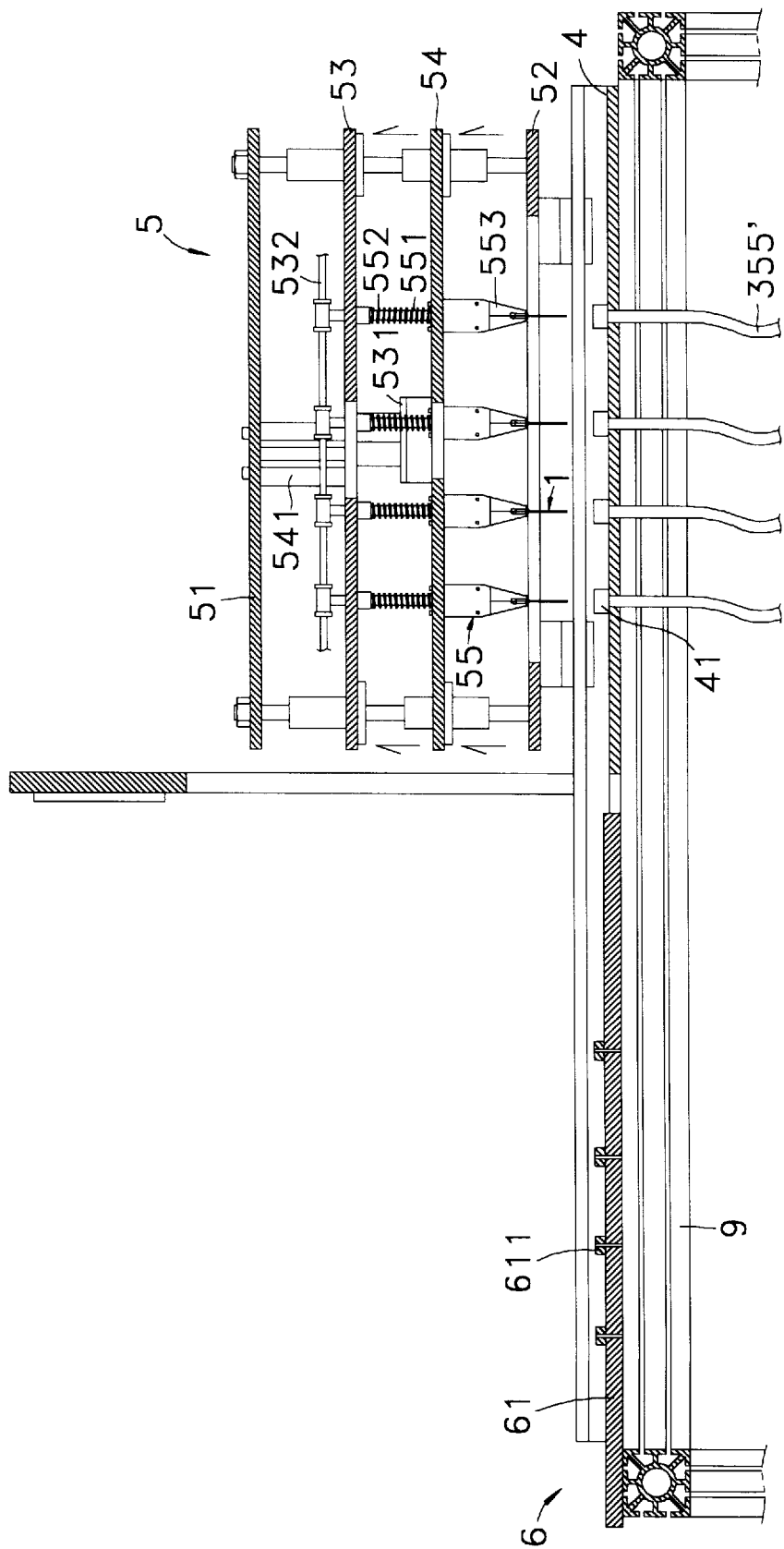
FIG. 19 is a sectional view showing another state of the transporting device of the present invention.
Figure 20:
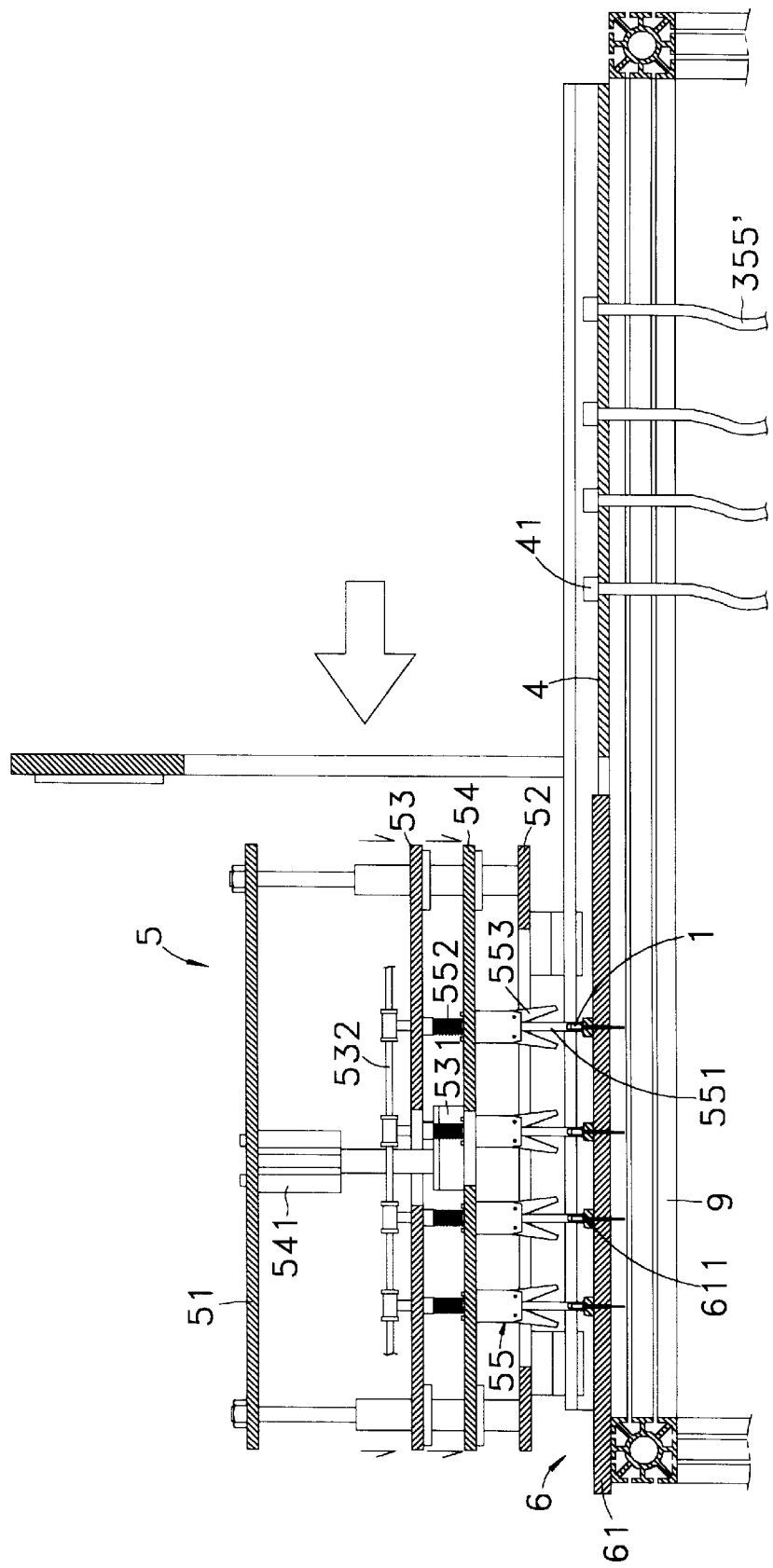
FIG. 20 is a sectional view showing another state of the transporting device of the present invention.
Figure 21:
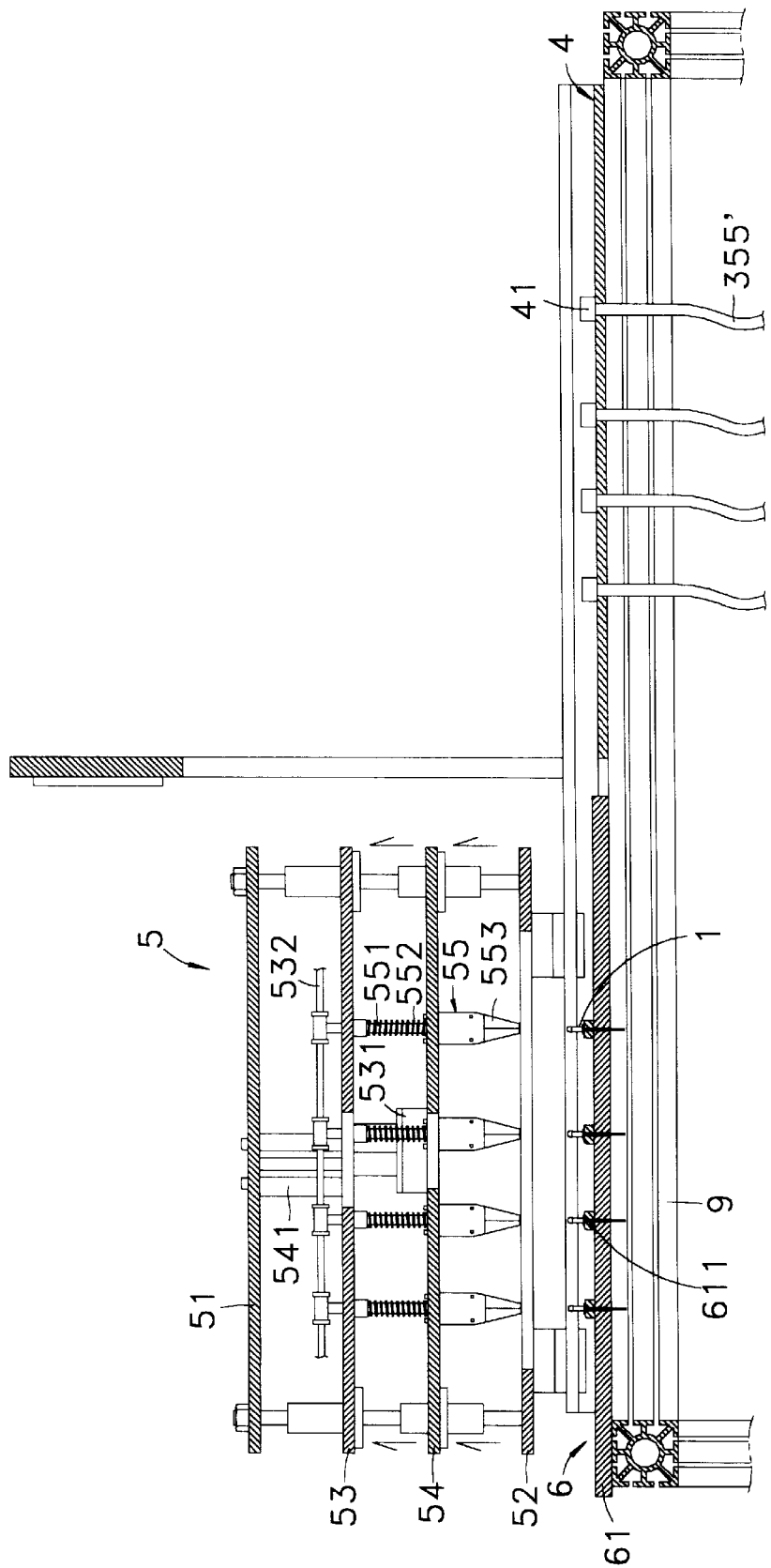
FIG. 21 is a sectional view showing a further state of the transporting device of the present invention.
Figure 22:
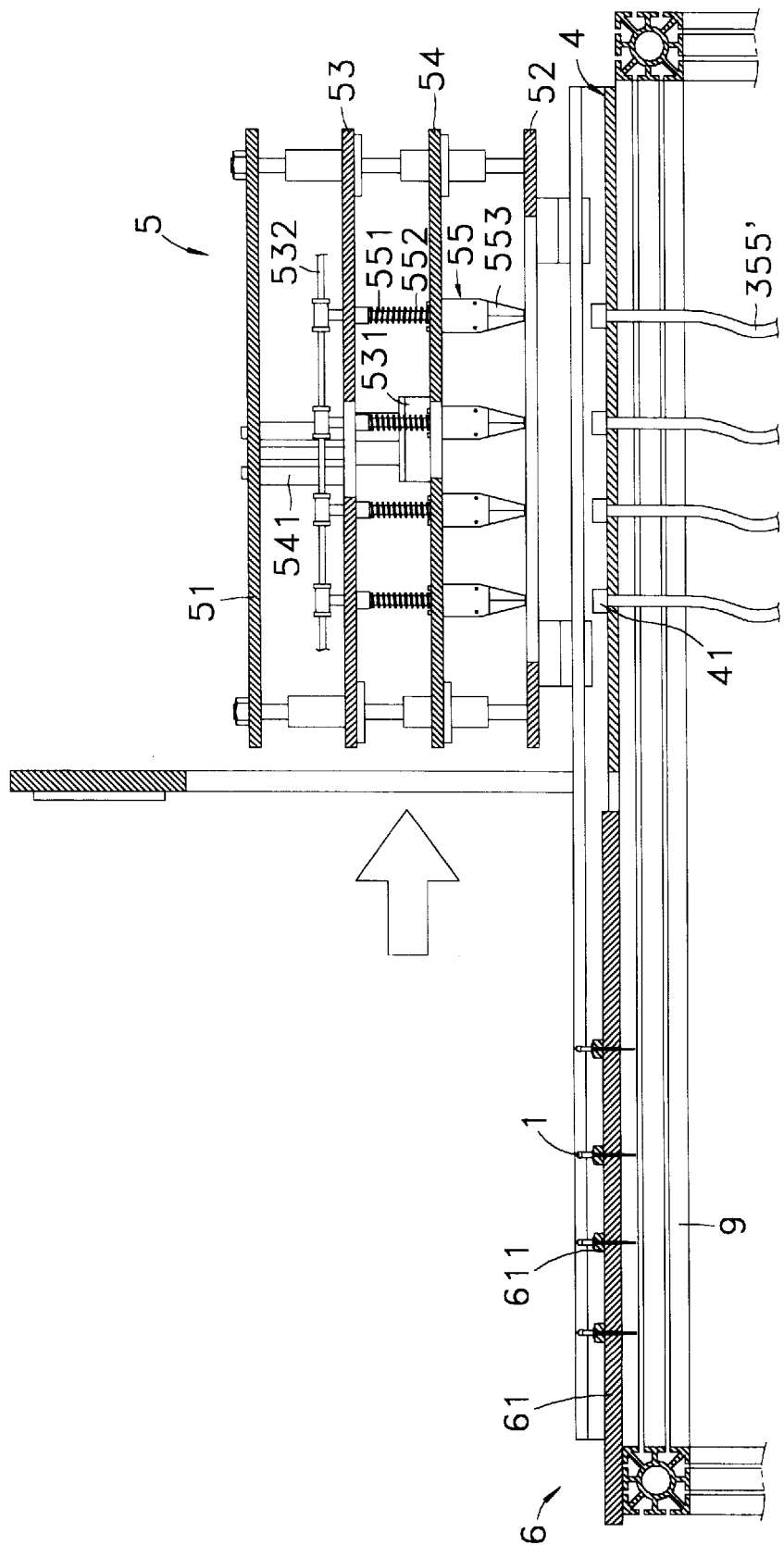
FIG. 22 is a sectional view showing an even further state of the transporting device of the present invention.

When the distributing unit 35 of the delivering device 3 has a predetermined amount of pull pins 1 (referring to FIG. 13), the transporting device 5 is located just above the positioning board 4 (referring to FIG. 17); and the control board 53 down presses the claws 55, the base board 54 lowers to make contact of the pipe like rods 551 with the pin picking holes 41 of the positioning board 4 (referring to FIG. 18). When the predetermined amount of pull pins 1 are delivered to the positioning board 4 via the delivering device 3, the positioning board 4 preliminarily dispose the predetermined amount of pull pins 1 at the given positions for connecting, and the predetermined amount of pull pins 1 are pushed by air pressure, so that the flanges 111 of the sleeves 11 of the predetermined amount of pull pins 1 contact the pipe like rods 551 of the claws 55. The pipe like rods 551 suck the pull pins 1 by providing the negative pressure generated in the negative pressure pipe 532 above the claws 55. Now the delivery pipes 355' stop blowing the compressed air, the pneumatic cylinder 531 for the claws is raised to lift the control board 53 to make the predetermined amount of pull pins 1 be tightly clamped by the claws 55 to complete the pin picking operation. After pin picking of the transporting device 5, the pneumatic elevator cylinder 541 retracts to raise the base board 54 to lift the claws 55 (referring to FIG. 19). Then the transporting pneumatic cylinder 521 is stretched to push the transporting device 5 (referring to FIG. 4), the latter then is displaced to the position above the pin receiving board 61 of the stretching device 6 to make precise alignment of the claws 55 with the stop stubs 611 (referring to FIG. 20). At this time, the pneumatic elevator cylinder 541 is stretched to lower the base board 54 to place thereon the claws 55, so that the shanks 12 of the predetermined amount of pull pins 1 held by the claws 55 can be precisely inserted into the stop stubs 611. Retracting of the pneumatic cylinder 531 for the claws presses down the control board 53 to loosen the claws 55 to place the pull pins 1 onto the stop stubs 611, thus pin receiving operation for the predetermined amount of pull pins 1 is completed. After pin receiving operation of the transporting device 5, the pneumatic elevator cylinder 541 retracts at once to raise the base board 54 to lift the claws 55, and the pneumatic cylinder 531 stretches to lift the control board 53 to close the claws 55 (referring to FIG. 21), the transporting pneumatic cylinder 521 retracts to draw the transporting device 5 back to the position above the positioning board 4 ready for the next pin receiving process (referring to FIGS. 22 and 4). Thereby, the transporting device 5 has the function of picking, transporting and placing the predetermined amount of pull pins 1.

Figure 27:
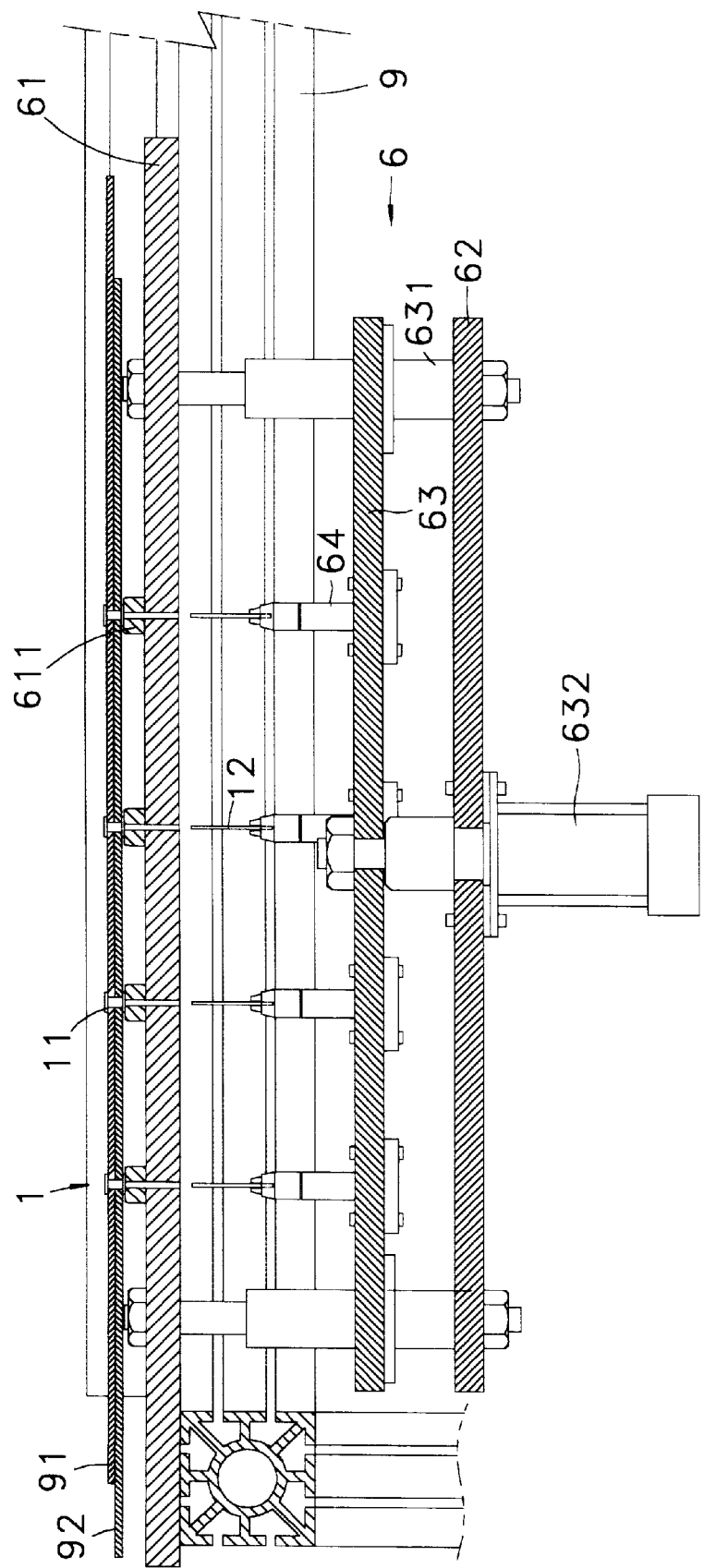
FIG. 27 is another sectional view showing the stretching device of the present invention.

When the pull pins 1 are to be fastened, it only needs to place the work piece on the pin receiving board 61, the predetermined amount of pull pins 1 can be fastened on the connecting holes on the work piece (referring to FIG. 26). A peddle is soon treaded lightly to down retract the middle board 63 by the oil pressure stretching cylinder 632 of the stretching device 6, so that the end of the clamping sets 64 get far away from the pin receiving board 61, and the clamping sets 64 tightly damp the shanks 12 of the predetermined amount of pull pins 1 (referring to FIG. 27). Now the sleeves 11 of the pull pins 1 are abutted against the stop stubs 611 to render the sleeves 11 to be forcedly deformed, the object of combing the plates 91, 92 with the predetermined amount of pull pins 1 can be achieved, and a function of fastening the pull pins 1 at one time can thus be provided. At this time, the middle board 63 is moved back by the elasticity of the springs 631 to have the middle board 63 slowly raised to approach the pin receiving board 61, thus the ends of the clamping sets 64 provided on the middle board 63 closely lean on the bottom of the pin receiving board 61 again, so that the clamping sets 64 again render the clamping blocks 643 to keep loose state. Thereby, the broken shanks 12 of the pull pins 1 clamped by the clamping sets 64 can fall onto a waste tank through a pipe in stead of waste treatment of the broken shanks 12 of the pull pins 1 by man power.

Accordingly, in the automatic pull pin fastening apparatus of the present invention with the capability of fastening a predetermined amount of pull pins 1 at one time by means of the positioning board 4, the transporting device 5 and the stretching device 6, by the mode of pushing the pull pins 1 from the delivering device 3 by compressed air and with a plurality of delivery pipes 355', when the automatic pull pin fastening apparatus is used for some other product, it needs only to change the positions of the stop stubs 611 of the pin receiving board 61 and simultaneously change the claws 55 of the transporting device 5 and the clamping sets 64 of the stretching device 6 and the positions of the pin picking holes 41 of the positioning board 4 to meet the positions of the holes on the plates to be combined, the operation of pull pin fastening of the product can be proceeded at once. Therefore, the pin fastening apparatus can meet the requirement of the plates to be combined at any time to change randomly the position arrangement of a predetermined amount of pull pins for fastening; this has excellent mobility of production, and the above mentioned heavy burden of requirement of changing equipment for different plates to be combined in the industry can be gotten rid of, and thereby the cost of processing can be effectively lowered.

In conclusion, the automatic pull pin fastening apparatus of the present invention operates by the mode of pushing the pull pins by compressed air, wherein, pulling and distribution of a predetermined amount of pull pins are done quickly at one time by means of the delivering device 3, the positioning board 4, the transporting device 5 and the stretching device 6, thereby, fastening of a large amount of pull pins can be easily completed in a very short time. The operation of pull pin fastening has the effect of automation processing, persons for work can be reduced and efficiency of production can be increased, work hours can be largely reduced and cost of production can be lowered.

Having thus described my invention, what I claim as new and desire to be secured by Letters Patent of the United States are:

1. An automatic pull pin fastening apparatus, comprising a feeding unit, a delivering device, a positioning board, a transporting device and a stretching device mounted on a machine, said machine is further provided thereon with an air pressure unit and an oil pressure unit to supply the required dynamic force, wherein:

said feeding unit is provided to have scattered pull pins tidied and then supplied for said delivering device;

said delivering device includes a tidying unit, a plurality of pin picking units and a distributing unit, said pin picking units each includes a lower guide block, an upper guide block, a support block and a pin picking pneumatic cylinder, said distributing unit includes an upper board and a lower board with a pin collecting block therebetween, and a movable panel, a delivery board, a delivery sliding platform and a pin distributing platform;

said transporting device is comprised of a transporting seat and a top board with a control board and a base board therebetween, said control board and said base board is adapted to free sliding between said transporting seat and said top board;

said stretching device includes a pin receiving board and a bottom board with a middle board located therebetween;

said pull pin fastening apparatus is characterized by that: said delivering device is installed between said feeding unit and said positioning board, said transporting device is mounted between said positioning board and said stretching device and is displaced to and fro therebetween, said delivering device sends fast by pushing a predetermined amount of pull pins to said positioning board at one time by using compressed air to be taken by said transporting device and for transporting to said stretching device, thus said stretching device pulls said predetermined amount of pull pins to combine a plurality of plates at one time to complete operation of pull pin fastening by automation processing.

2. An automatic pull pin fastening apparatus as claimed in claim 1, wherein, said pin picking units are provided on a pin picking seat, said lower guide block and said upper guide block of said pin picking units have said slide block mounted therebetween and on said support block, said support block has a grooved rail for receiving said pull pins and has a groove for receiving a pin pushing block and a pin stop block respectively on the two ends thereof, one end of said slide block is provided with said pin picking pneumatic cylinder to control the position in sliding of said slide block.

3. An automatic pull pin fastening apparatus as claimed in claim 2, wherein, said pin picking seat is provided with a plurality of conical holes which each has on one end thereof a slot, so that said pull pins are smoothly guided into said conical holes with their heads pointing upwards by providing said slots.

4. An automatic pull pin fastening apparatus as claimed in claim 1, wherein, said pin collecting block is connected with one end of said delivery board, while the other end of the delivery board is connected to a movable panel pneumatic cylinder of which a pusher rod is extended through said pin collecting block to connected with said movable panel, said movable panel closely leans on said pin collecting block so that said movable panel pneumatic cylinder makes synchronic movement of said movable panel therewith;

said delivery sliding platform is provided between said pin collecting block and said pin distributing platform which has thereon a sliding-platform pneumatic cylinder in connection with said delivery sliding platform, so that said delivery sliding platform is displaced by means of said sliding-platform pneumatic cylinder;

said pin distributing platform is mounted on said lower board, and is connected with a positioning pneumatic cylinder set provided on said lower board, so that said pin distributing platform is displaced sectionally by said positioning pneumatic cylinder set;

said upper board, pin collecting block, movable panel, delivery board and delivery sliding platform are all provided with a plurality of through holes or holes, position arrangements of said through holes or holes for the members are same; said through holes of said delivery board are provided thereon with nozzles to connect a plurality of delivery pipes, said delivery sliding platform is provided therein with a plurality of air ways which respectively communicate with said air pressure unit and said through holes or holes of said delivery board to deliver a predetermined amount of pull pins.

5. An automatic pull pin fastening apparatus as claimed in claim 1, wherein, said positioning board is a plane plate, and is provided thereon with said pin picking holes of which the positions are in correspondence with those of openings on a plurality of plates to be combined, said pin picking holes connect with one of two ends of each of a plurality of delivery pipes to distribute said predetermined amount of pull pins at their given positions on said positioning board for connecting, this provides a function of preliminary disposing of said pins.

6. An automatic pull pin fastening apparatus as claimed in claim 1, wherein, said base board is provided with a plurality of claws and a pneumatic cylinder, said claws correspond by position to those of openings on a plurality of a plurality of plates to be combined, said control board is connected with said pneumatic cylinder which makes said control board move synchronically therewith to control opening and closing of said claws;

a pneumatic elevator cylinder is mounted on said top board, while said base board is connected with said pneumatic elevator cylinder, thereby, said pneumatic elevator cylinder brings said control board and said base board to move synchronically therewith to control positions of said claws.

7. An automatic pull pin fastening apparatus as claimed in claim 6, wherein, said control board is provided with a negative pressure pipe in communication with said claws.

8. An automatic pull pin fastening apparatus as claimed in claim 6, wherein, said claws each includes a pipe like rod slipped thereover a spring to push each of a plurality of clamping blocks, said pipe like rod is a hollow pipe, the inner diameter of said pipe like rod is between the values of the external diameters of a sleeve and a flange of any of said pull pins, said pipe like rod is connectible on an open end thereof to said negative pressure pipe, while the other end thereof is adapted to receiving said sleeve of said pull pin, said pipe like rods are adapted for pushing to open and retracting to close said clamping blocks by elasticity of said springs, said pipe like rods tightly suck each pull pin by suction force generated by said negative pressure pipe when said clamping blocks of said claws open, in this way, each claw holds by suction a pull pin.

9. An automatic pull pin fastening apparatus as claimed in claim 1, wherein, said pin receiving board is provided thereon with a plurality of stop stubs, the center of each of said stop stubs has a through hole exactly fitting a shank of any of said pull pins, positions of said centers correspond to those openings on a plurality of plates to be combined; said middle board is mounted thereon a plurality of clamping sets of which the positions correspond to those openings on said plates to be combined, said pin receiving board is provided thereon with a plurality of stop stubs, a plurality of springs are located between said middle board and said bottom board, and said middle board is connected with an oil pressure stretching cylinder to allow up and down sliding of said middle board.

10. An automatic pull pin fastening apparatus as claimed in claim 9, wherein, said clamping sets each includes a pipe body to mount therein a spring, a movable block and clamping blocks, said movable blocks each is a hollow pipe, one end thereof is mounted therein with a spring, while the other end thereof is a conical surface, said clamping blocks are adapted to closing to form a conical shape with a conical surface and a toothed slit for engaging a pull pin.

* * * * *